United States Patent
Fujii et al.

(10) Patent No.: US 7,855,994 B2
(45) Date of Patent: Dec. 21, 2010

(54) RADIO TRANSCEIVER AND RADIO TRANSMITTING METHOD

(75) Inventors: Hiromasa Fujii, Yokosuka (JP); Takatoshi Sugiyama, Yokohama (JP); Hitoshi Yoshino, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 558 days.

(21) Appl. No.: 11/411,174

(22) Filed: Apr. 26, 2006

(65) Prior Publication Data

US 2006/0274777 A1 Dec. 7, 2006

(30) Foreign Application Priority Data

Apr. 26, 2005 (JP) .............................. 2005-128500

(51) Int. Cl.
*H04B 7/216* (2006.01)
(52) U.S. Cl. ....................... 370/335; 370/350; 370/347; 370/503; 370/504; 370/505; 370/506; 370/507; 370/508; 370/509; 370/510; 370/511; 370/512; 370/513; 370/514; 370/515; 370/336
(58) Field of Classification Search ................. 370/335, 370/350, 503–515, 347, 336
See application file for complete search history.

(56) References Cited

U.S. PATENT DOCUMENTS 5,574,979 A * 11/1996 West .......................... 455/63.1
6,463,261 B1 * 10/2002 Hiramatsu et al. ......... 455/63.1
6,480,483 B2 * 11/2002 Yahata et al. ............... 370/350

2004/0202119 A1 10/2004 Edge

FOREIGN PATENT DOCUMENTS

EP 0 848 508 A2 6/1998

(Continued)

OTHER PUBLICATIONS

Hiromasa Fujii, et al. "Turbo Receiver with SC/Simplified-MMSE (S-MMSE)Type Equalizer for MIMO Channel Signal Transmission", 2003 IEEE 58$^{th}$ Vehicular Technology Conference VTC, Fall 2003, pp. 632-636.

(Continued)

*Primary Examiner*—Rafael Pérez-Gutiérrez
*Assistant Examiner*—Munjal Patel
(74) *Attorney, Agent, or Firm*—Oblon, Spivak, McClelland, Maier & Neustadt, L.L.P.

(57) ABSTRACT

In a mobile communication system, multiple transceivers perform radio communications in the same frequency band. A transceiver (700) comprises a first sync timing detection part (706) configured to detect sync timing for a desired signal transmitted from a counterpart transceiver; a second sync timing detection part (708, 710) configured to detect sync timings for one or more undesired signals from non-counterpart transceiver(s); an error information determination part (712) configured to determine error information based on the sync timings for the desired and undesired signals; a signal generating part (714) configured to generate a feedback signal containing the error information; a transmission timing determination part (722) configured to update transmission timing for a transmission signal including the feedback signal according to a control signal received from the counterpart transceiver; and a transmission part (736) configured to transmit the transmission signal to the counterpart transceiver according to the updated transmission timing.

13 Claims, 21 Drawing Sheets

FOREIGN PATENT DOCUMENTS

| | | |
|---|---|---|
| JP | 63-082028 | 4/1988 |
| JP | 07-067171 | 3/1995 |
| JP | 10-190562 | 7/1998 |
| JP | 2004-297756 | 10/2004 |

OTHER PUBLICATIONS

Office Action mailed Oct.12, 2010, in Japanese Patent Application No. 2005-128500, filed Apr. 26, 2005 (with English Translation).

* cited by examiner

RADIO TRANSCEIVER AND RADIO TRANSMITTING METHOD

FIELD OF THE INVENTION

The present invention generally relates to a wireless communication technique, and more particularly to a cellular transceiver and a radio transmitting method used in mobile communications systems allowing multiple cellular devices to communicate with each other using the same frequency band.

BACKGROUND OF THE INVENTION

Carrier sense multiple access with collision avoidance (CSMA/CA) is a known network control protocol, in which a carrier sensing scheme is used to allow multiple radio transceivers to share the same frequency band for radio communications under collision avoidance control, and it may be applied to wireless LANs (local area networks). With CSMA/CA, a transceiver performs carrier sensing prior to data transmission in order to determine whether there is another user carrying out radio communication. The transceiver can start transmitting data packets only if no users are sensed. Presence or absence of other users can be determined by, for example, measuring an interference level in the environment. If there is another user detected, data transmission is retried after a random period of time.

FIG. 1 is a schematic diagram illustrating a typical CSMA/CA transceiver, in which an interference level is measured at a received signal power level measuring unit to determine availability of a data transmission channel. Since with CSMA/CA a user cannot start transmission when another user is communicating, unacceptable delay may be produced in real-time communications and streaming transmission. In addition, as the number of users increases, communication may be restricted for a long period of time depending on the user environment.

Meanwhile, a technique for spatially multiplexing independent signals on the transmission side and separating the signals from each other making use of channel differences on the receiving side is proposed. See, for example, Hiromasa Fujii, et al., "A Turbo Equalizer with Simplified MMSE Filtering for MIMO Channel Signal Transmission", 2003 IEEE 58$^{th}$ Vehicular Technology Conference VTC, fall, 2003. This technique allows multiple transceivers to carry out radio communications at the same time. The two transceivers communicating with each other are obviously in sync with each other; however, the transceivers communicating parallel to each other may be out of synchronization, as illustrated in FIG. 2. When multiple transceivers perform radio communication at asynchronous timing, detection accuracy of pilot symbols (or channels) from the respective transceivers and channel estimation accuracy are degraded. To this end, it is desired for communication pairs A-A' and B-B' to perform synchronous transmission, as illustrated in FIG. 3. In addition, when communication group 1 including the communication pair A-A' is approaching close to or merging with another communication group 2 including communication pair C-C', it is desired that all the communication pairs in the communication groups 1 and 2 be in sync with each other. Bringing all the transceivers to operate in sync with each other can improve the accuracy in signal detection from a spatially multiplexed signal, as well as increase the system capacity. It is also desirable that not only frames, but also symbols be in sync with each other.

To bring multiple transceivers to operate in sync with each other, the global positioning system (GPS) may be used, or alternatively, a synchronizing signal (such as a beacon) may be transmitted from prescribed communication equipment. However, using GPS is disadvantageous indoors or when not in line-of-sight, and using a synchronizing signal requires additional expense. With the latter method, synchronization cannot be assured if the transceivers are out of the service area.

Another publication, JP 10-190562A, employs a structure shown in FIG. 4, in which a reference base station A is determined in advance, and other base stations B and C are in sync with the reference base station A to control the transmission timing of each of the transceivers. However, this technique is applicable only to radio communications between a base station and a mobile station, and cannot be applied as it is to an adhoc network. In addition, it is difficult in fact in a rapidly changing environment to select and fix a base station most suitable for the reference base station in advance from among many base stations. The synchronization described in JP 10-190562A is frame synchronization, and more precise synchronization, such as symbol synchronization, is not intended. In order to appropriately carry out signal detection (or separation) from spatially multiplexed signals, symbol synchronization is required in addition to frame synchronization.

Still another publication, JP 2004-297756A, discloses a transmission timing control technique in code division multiple access (CDMA). Synchronous transmission described in this publication is between a base station and mobile stations located under this base station, as illustrated in FIG. 5. This publication does not propose synchronization between mobile stations.

SUMMARY OF THE INVENTION

Embodiments of the present invention provide a radio transceiver and a radio transmitting method enabling autonomous control for transmission timing depending on the communications environment.

In one aspect of the invention, in a mobile communication system, multiple transceivers perform radio communications in the same frequency band. A transceiver comprises:

(a) a first sync timing detection part configured to detect sync timing for a desired signal transmitted from a counterpart transceiver;

(b) a second sync timing detection part configured to detect sync timings for one or more undesired signals from non-counterpart transceiver(s);

(c) an error information determination part configured to determine error information based on the sync timings for the desired and undesired signals;

(d) a signal generating part configured to generate a feedback signal containing the error information;

(e) a transmission timing determination part configured to update transmission timing for a transmission signal including the feedback signal according to a control signal received from the counterpart transceiver; and (f) a transmission part configured to transmit the transmission signal to the counterpart transceiver according to the updated transmission timing.

With this arrangement, transmission timing of the transceiver can be adjusted autonomously according to the communications environment.

In another aspect of the invention, a radio transmitting method applied to a mobile communication system allowing multiple transceivers to communicate in the same frequency band is provided. The method includes the steps of:

(a) detecting sync timing for a desired signal from a counterpart transceiver;

(b) outputting a communication status signal representing a communication status of a non-counterpart transceiver;

(c) performing weighting averaging sync timing for an undesired signal from the non-counterpart transceiver based on the communication status signal to calculate target sync timing;

(d) determining transmission timing based on a time period indicated in a control signal received from the counterpart transceiver; and (e) transmitting a transmission signal including a feedback signal representing a certain time period to the counterpart transceiver according to the transmission timing.

In the weighting averaging, a weighting coefficient may be selected so as to allow the sync timing of the desired signal to approach the weighting-averaged (modified) sync timing of the undesired signal determined by shifting the undesired signal sync timing toward the desired signal side.

The feedback signal represents, for example, a time period shorter than a timing difference between the sync timing for the desired signal and the target sync timing.

Alternatively, the feedback signal may represent the timing difference between the sync timing for the desired signal and the target sync timing.

BRIEF DESCRIPTION OF THE DRAWINGS

Other features and advantages of the invention will become more apparent from the following detailed description when read in conjunction with the accompanying drawings, in which.

DETAILED DESCRIPTION OF THE PREFERRED EMBODIMENT

The preferred embodiment of the present invention is described below in conjunction with the attached drawings.

Example 1

Figure 1:
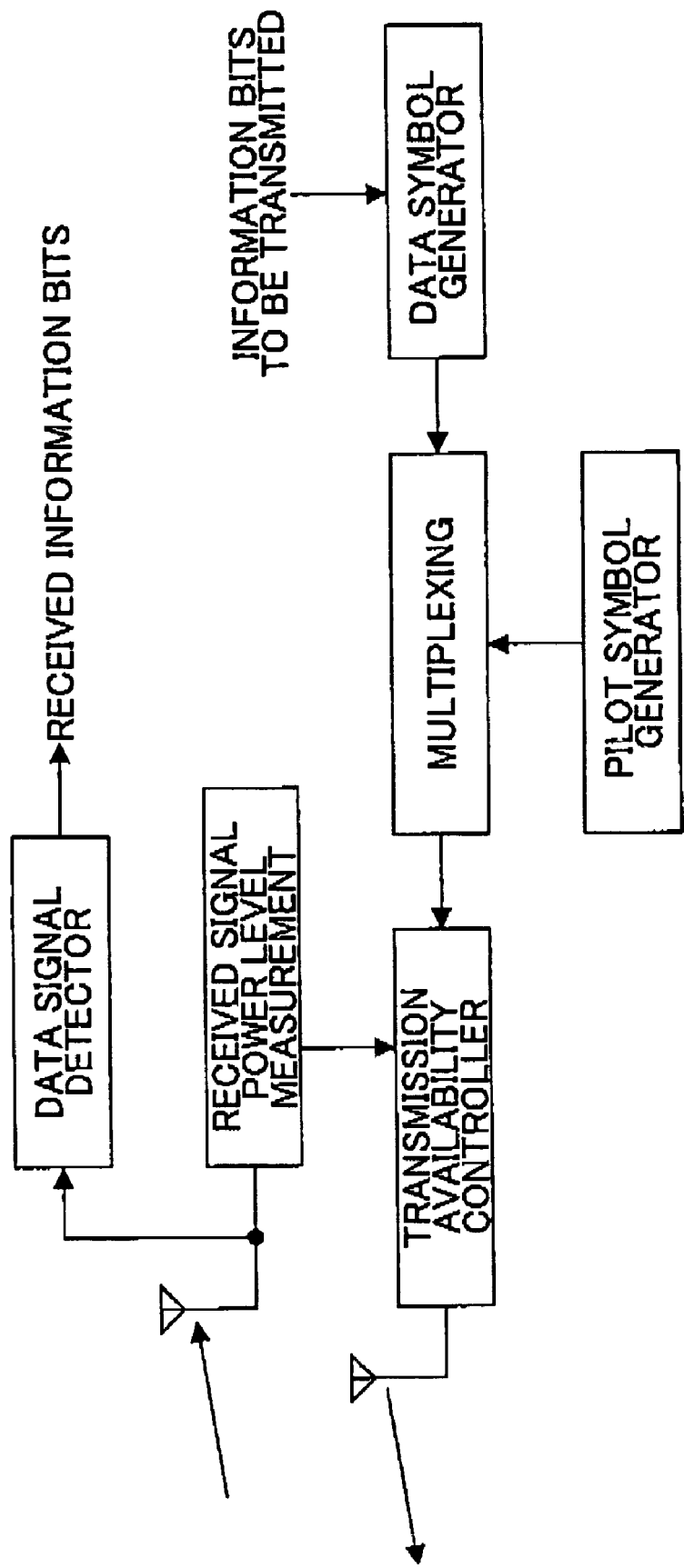
FIG. 1 is a schematic block diagram of a conventional radio transceiver.
Figure 2:
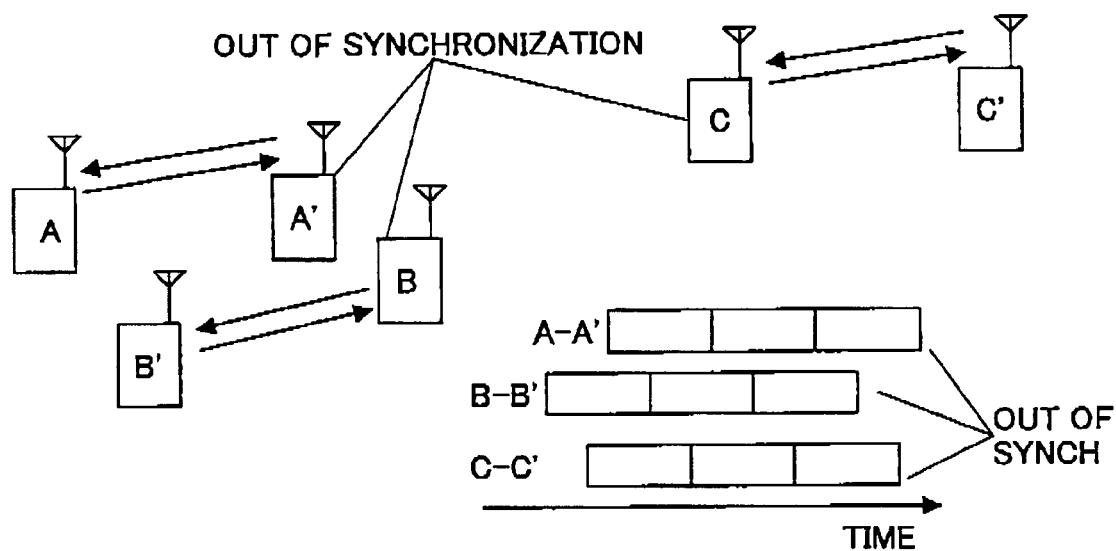
FIG. 2 is a schematic diagram illustrating multiple transceiver pairs simultaneously communicating with each other.
Figure 3:
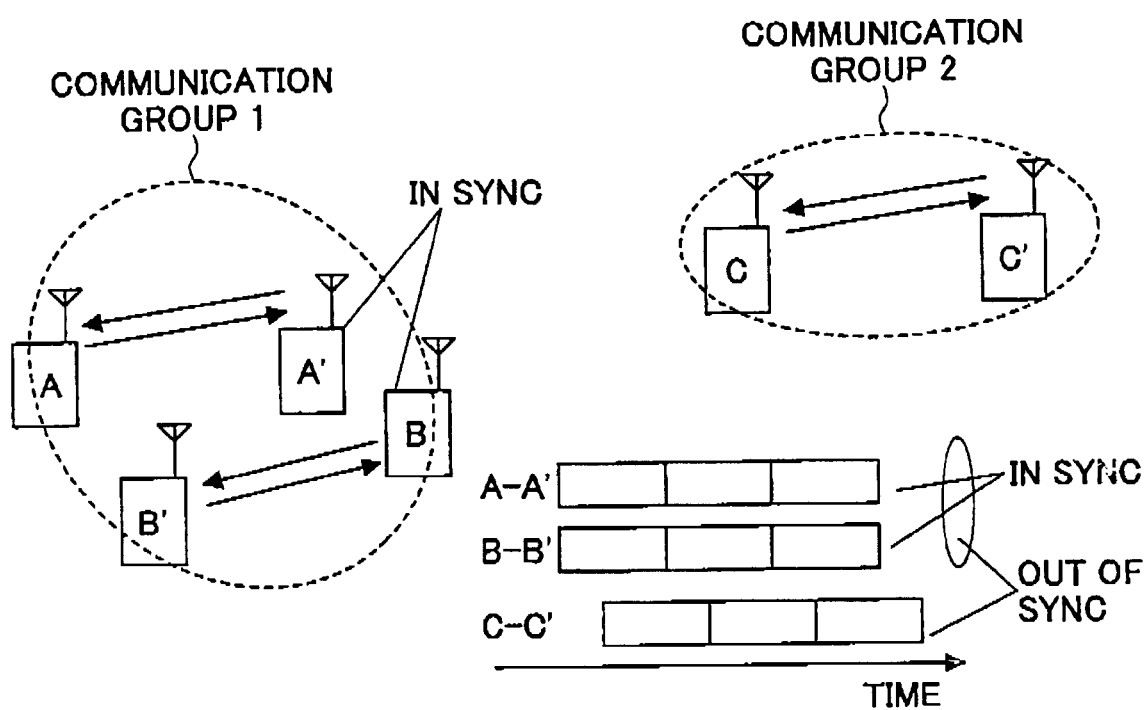
FIG. 3 is another example in which multiple transceiver pairs are communicating with each other.
Figure 4:
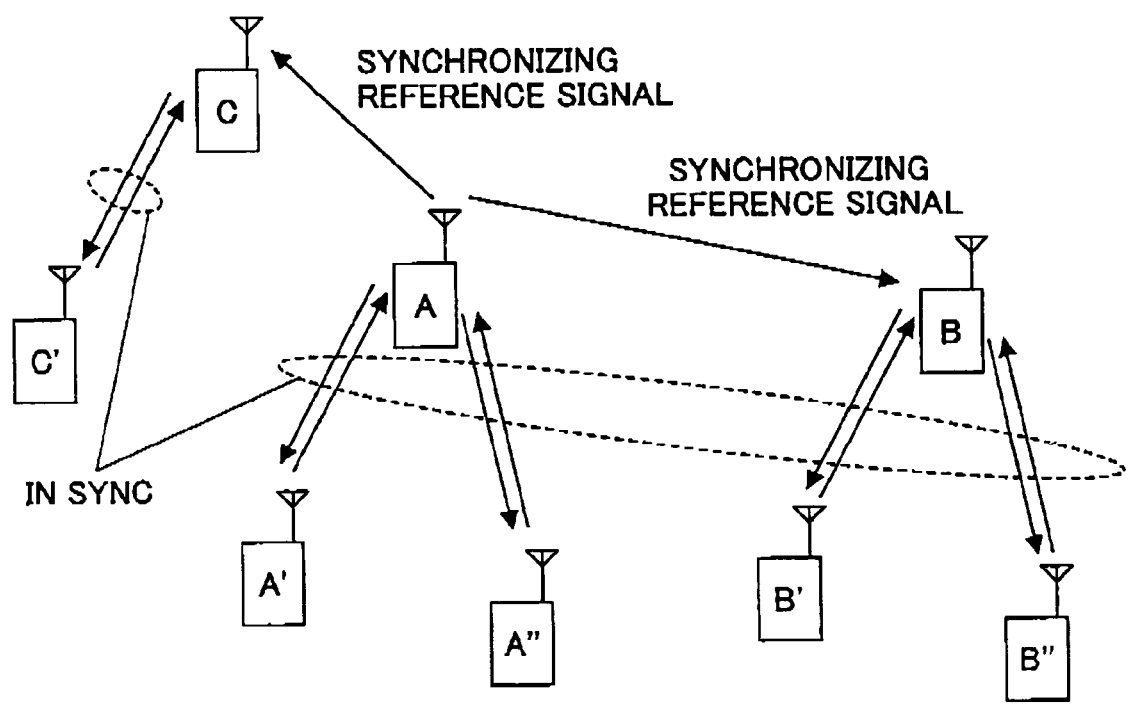
FIG. 4 illustrates a known technique in which transceivers belonging to respective base stations communicate in sync with each other based on synchronizing reference signals.
Figure 5:
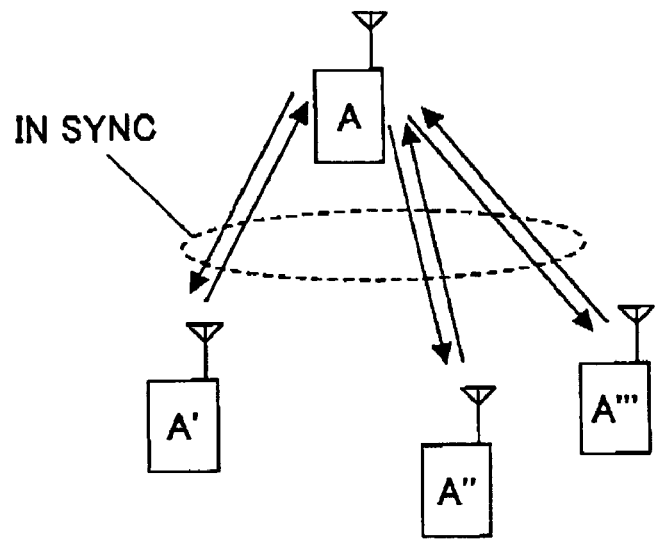
FIG. 5 illustrates an example of synchronous communications between a base station and mobile stations located under this base station.
Figure 6:
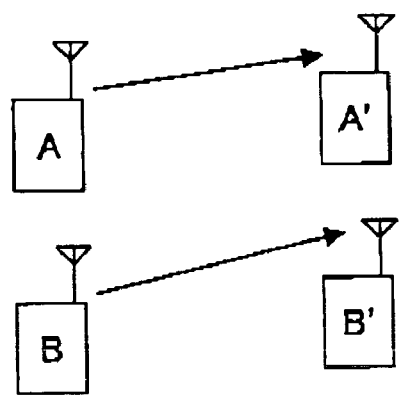
FIG. 6 illustrates an example of multiple transceiver pairs communicating with each other.

FIG. 6 is a schematic diagram illustrating an example of circumstances of radio communication, in which transceivers A and A' are starting radio communication between them in the vicinity of transceivers B and B' that are already communicating with each other. These transceivers have similar structures and functions.

Figure 7:
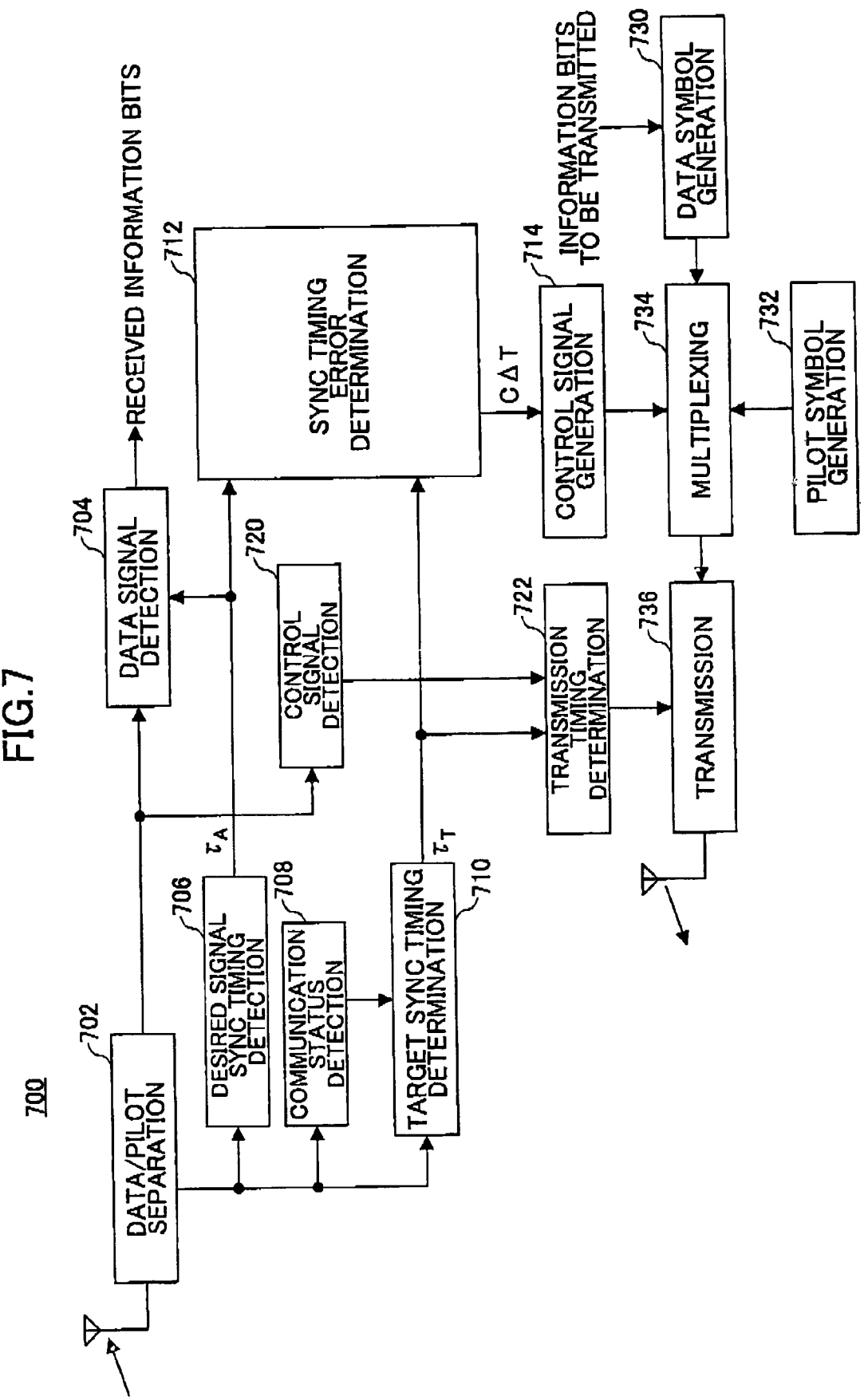
FIG. 7 is a schematic block diagram of a transceiver according to an embodiment of the invention.

FIG. 7 is a functional block diagram of a transceiver 700, which may be applied to any one of the transceivers shown in FIG. 6. The transceiver 700 is typically applied to a cellular mobile device; however, it may be applied to other radio communication devices and equipment. The transceiver 700 has a data/pilot separating unit 702, a data signal detection unit 704, a desired signal sync timing detection unit 706, a communication status detection unit 708, a target sync timing detection unit 710, a sync timing error determination unit 712, a control signal generating unit 714, a control signal detection unit 720, a transmission timing determination unit 722, a data symbol generating unit 730, a pilot symbol generating unit 732, a multiplexing unit 734, and a transmission unit 736.

The data/pilot separating unit 702 separates a pilot signal from a signal received at an antenna and outputs the pilot signal and the other signal component (a data signal) independently. The pilot signal represents content known in advance on the transmitting side and the receiving side. The data signal represents content transmitted through a control channel and/or a data channel.

The data signal detection unit 704 detects a data signal (or channel) from the counterpart transceiver from the received signal and outputs the detected signal for demodulation. The received signal contains not only a desired signal from the counterpart transceiver, but also interference or undesired signals from non-counterpart transceivers not currently communicating with the transceiver 700. The counterpart transceiver is a device or a user to and from which information is transmitted. In the example shown in FIG. 6, transceiver A' is a counterpart of transceiver A, while transceivers B and B' are non-counterparts for transceiver A. Which transceiver is a counterpart is determined on a relative basis. A counterpart of transceiver B' is transceiver B, while transceivers A and A' are non-counterparts for transceiver B'. The data signal detection unit 704 separates the desired signal from interference signals using a known signal detecting technique, such as maximum likelihood of detection (MLD) method available in MIMO multiplexing, least mean squares (LMS) method, or Bell laboratories layered space time (BLAST) method.

The desired signal sync timing detection unit 706 detects and outputs sync timing for the desired signal from the counterpart transceiver. The desired signal sync timing detection unit 706 does not output significant signals until radio communication is started with another transceiver (counterpart). The detected sync timing is supplied to the data signal detection unit 704 and the sync timing error determination unit 712.

Figure 8:
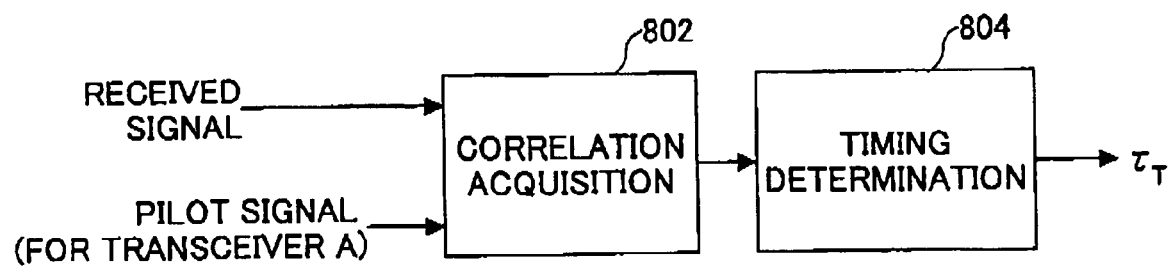
FIG. 8 is a schematic diagram of the target sync timing determination unit shown in FIG. 7.

FIG. 8 is a schematic block diagram of the sync timing detection unit 706. It is assumed that in this context transceiver 700 is transceiver A' shown in FIG. 6. Accordingly, transceiver A is a counterpart, and the signal from transceiver A is a desired signal. Presence or absence of the desired signal in the received signal can be determined by making use of the pilot signal. A correlation acquiring unit 802 calculates correlation between the received signal and the pilot signal for transceiver A, and a timing determination unit 804 determines sync timing for the desired signal. The sync timing is, for example, first path timing in the output correlation. Because the amplitude of a path depends on power, a path whose power level first exceeds a prescribed level may be selected as a first path. In this case, the sync timing includes symbol sync timing and frame sync timing. Concerning symbol sync timing, if orthogonal frequency division multiplexing (OFDM) is employed, a property wherein the guard interval information equals a portion of a symbol sequence may be used in place of or in addition to the pilot signal. If code division multiple access (CDMA) is employed, a spreading code may be used in place of or in addition to the pilot signal to calculate symbol sync timing.

Returning to FIG. 7, the communication status detection unit 708 detects or monitors the communication status of nearby transceivers based on the input signal. The surrounding communication status can be determined by measuring the interference level of the received signal. The communication status detection unit 708 receives a signal at a frequency band available for the transceiver 700 when the transceiver is not transmitting signals and measures the power level of the received signal to determine the communication status (i.e., whether the available frequency band is actually used for radio communication). If the system is designed such that each transceiver transmits a different pilot signal, the communication status detection unit 708 can distinguish interference levels of multiple transceivers from each other. By detecting the pilot signal, a transceiver that is going to start radio communication can synchronize itself with other transceivers already communicating with each other.

The target sync timing determination unit 710 calculates and outputs target sync timing $\tau_T$. In FIG. 6, for example, transceiver A' detects sync timing of transceivers B and B' prior to starting communications. In this case, the sync timing between transceivers B and B' is output as target sync timing. If time division duplexing is employed to use the same frequency for transmission and reception of signals, communication direction is well controlled and accordingly, the transceiver A' may only detect sync timing of transceiver B before radio communications is started.

Figure 9:
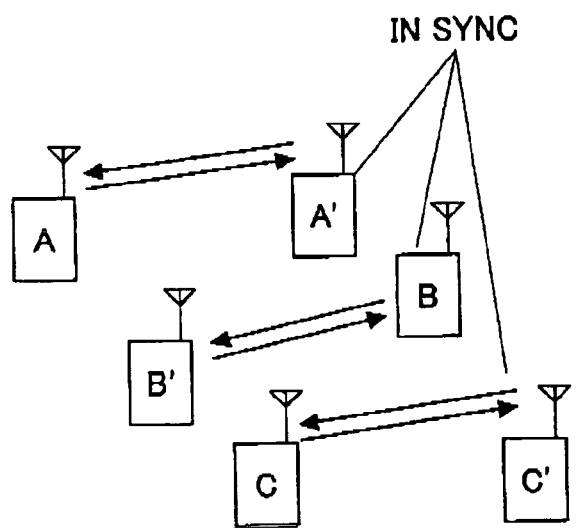
FIG. 9 is a schematic diagram illustrating multiple transceiver pairs communicating in sync with each other.
Figure 10:
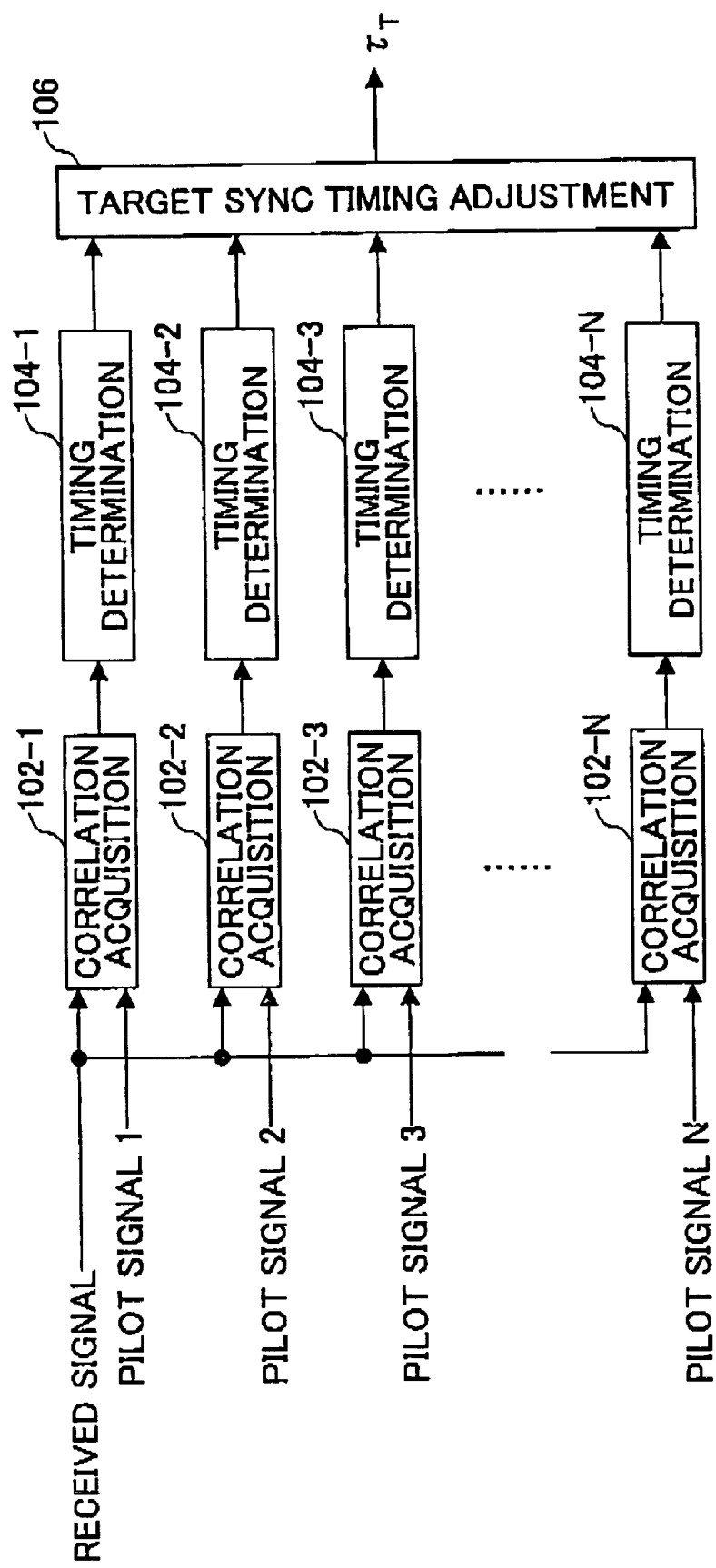
FIG. 10 is another example of the target sync timing determination unit shown in FIG. 7.

Although FIG. 6 illustrates only transceivers B and B' as non-counterparts for transceiver A', many other non-counterpart transceivers may exist. In this case, the target sync timing determination unit 710 outputs a single target sync timing based on measured multiple sync timings. This case is illustrated in FIG. 9, in which many communication pairs conduct radio communications in sync with each other. In this case, the target sync timing determination unit 710 may be structured as illustrated in FIG. 10. Sync timing is determined for each of the pilot signals (or the transceivers) by one of correlation acquiring units 102-1 through 102-N and the associated one of timing determination units 104-1 through 104-N. The detected sync timings are input to the target sync timing adjusting unit 106, and a single sync timing is output by, for example, averaging the detected timings. The average is in general a weighted average. In this context, the weighted average includes an arithmetic average with a uniform weighting coefficient. More generally, target sync timing may be expressed as a linear combination of multiple sync timings. In this embodiment, multiple sync timings to be linearly combined are those of undesired signals; however, in another embodiment described below, the sync timing of the desired signal may also be combined in addition to sync timings of undesired signals.

Returning again to FIG. 7, the sync timing error determination unit 712 calculates a difference $\Delta T$ between sync timing for the desired signal and target sync timing. The difference is multiplied by a coefficient c (0<c<1) and then output as an error signal c*$\Delta T$.

The control signal generating unit 714 generates a control signal. The control signal contains the error signal c*$\Delta T$. The control signal is input to the multiplexing unit 734 so as to be fed back to the counterpart transceiver. In this embodiment, the transceiver 700 requests the counterpart transceiver to put ahead or put off (back) the transmission timing by a time period defined by the error signal. Thus, each of the transceivers controls the transmission timing in response to a request from the counterpart transceiver.

The control signal detection unit 720 detects a control channel contained in the data signal transmitted from the counterpart transceiver. Since the transceivers used in this embodiment have the same structure, the control channel detected by the control signal detection unit 720 contains c*$\Delta T$' representing a timing difference measured and modified by the counterpart transceiver. This timing difference (error) information is supplied to the transmission timing determination unit 722. Whether $\Delta T$ equals $\Delta T$' depends on the communications environment and/or the topology.

The transmission timing determination unit 722 determines or updates transmission timing based on the target sync timing supplied from the target sync timing determination unit 710 and/or the modified timing difference supplied from the control signal detection unit 720. For example, before radio communication is started, transmission timing is determined based on the target sync timing. During communications, transmission timing may be controlled based on the modified timing difference, or on both the modified timing difference and the target sync timing. Transmission timing may also be determined taking into account the distance from the counterpart transceiver and/or signal propagation delay due to the distances from non-counterpart transceivers.

The data symbol generating unit 730 generates data symbols representing the information contained in the data channel.

The pilot symbol generating unit 732 generates a pilot symbol sequence (or a pilot channel) for the transceiver 700 and supplies the generated pilot channel to the multiplexing unit 734. The pilot symbol sequence may be stored in advance in a memory, or alternatively, it may be produced as necessary.

The multiplexing unit 734 multiplexes the control channel, the pilot channel, and the data channel (if there is one) to produce a transmission signal. Multiplexing is carried out using one or any combination of time multiplexing, frequency multiplexing, and code multiplexing.

The transmission unit 736 transmits the transmission signal supplied from the multiplexing unit 734 based on the transmission timing determined by the transmission timing determination unit 722.

Figure 11:
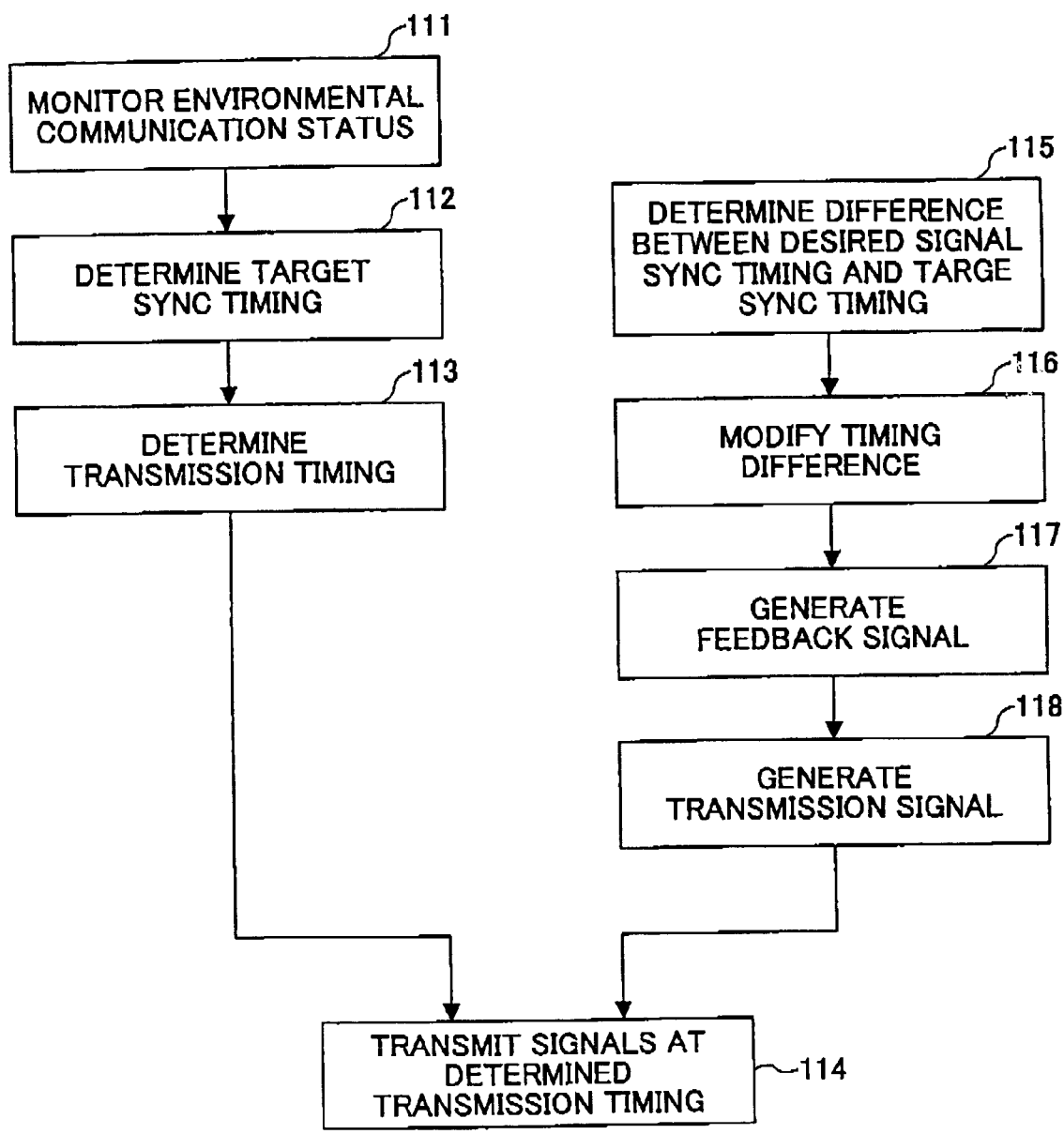
FIG. 11 is a flowchart of a radio transmitting method according to an embodiment of the invention.

FIG. 11 is a flowchart showing the operations carried out by the transceiver 700 shown in FIG. 7 according to an embodiment of the invention. In step 111, the surrounding (or environmental) communications status is monitored by the communication status detection unit 706.

In step 112, target sync timing is determined. If two or more sync timings of non-counterpart transceivers are detected, single sync timing is determined as the target sync timing.

In step 113, transmission timing is determined. If radio communication with the counterpart transceiver has not been established, transmission timing is determined according to the target sync timing. If the transceiver is communicating with the counterpart transceiver, transmission timing is determined based on the control signal (representing a modified timing difference) supplied from the counterpart transceiver. In this step, transmission timing may be determined taking the target sync timing into account in addition to the control signal. If a non-counterpart transceiver does not currently exist in the vicinity or is not performing radio communication, specific target sync timing is not determined. In this case, the transceiver determines transmission timing without strict restriction.

In step 114, a transmission signal is transmitted at the determined timing. The transmission signal is produced according to steps 115 through 118. All or a part of these steps may be performed in parallel to steps 111 through 113 or at a different time.

In step 115, a difference $\Delta T$ between sync timing of the desired signal and the target sync timing is determined by the sync timing error determination unit 712.

Figure 12:
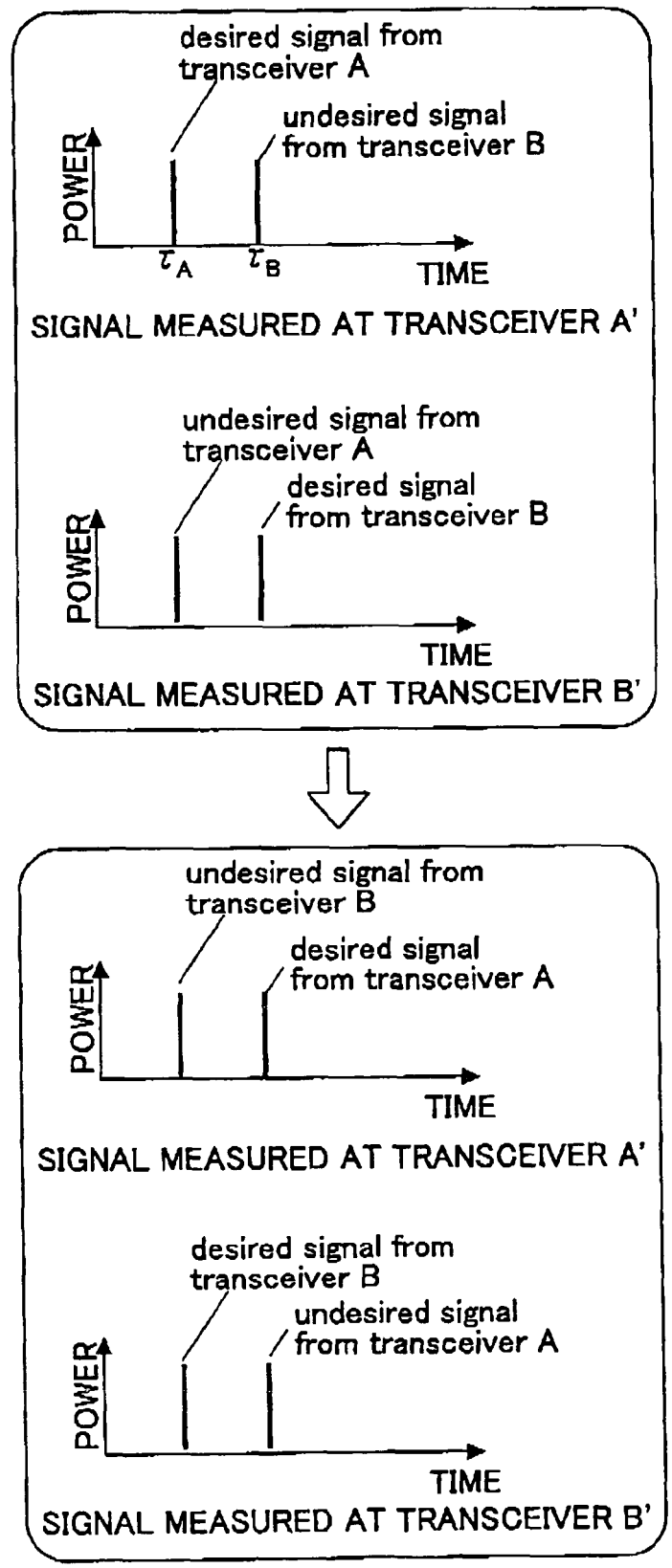
FIG. 12 is a schematic diagram illustrating timings of received signals measured at transceivers A' and B' where coefficient c equals 1 (c=1)

In step 116, the calculated timing difference is modified to $c*\Delta T$ by multiplying the timing difference $\Delta T$ by a coefficient c (0<c<1). The reason why the timing difference is modified using the coefficient c is explained in conjunction with FIG. 12. In the environment shown in FIG. 6, the first paths of the counterpart and non-counterpart transceivers measured at each of the transceivers A' and B' are illustrated in the top diagram of FIG. 12. In this situation, the first path of transceiver A is observed at time $\tau_A$, and then the first path of transceiver B is observed after $\Delta T$, that is, at $\tau_B=\tau_A+\Delta T$ at both transceivers A' and B'. The timing difference calculated by the transceiver A' is $\Delta T$. All the transceivers try to synchronize with each other. If transceiver A' requests transceiver A to put off the transmission timing by unmodified timing difference $\Delta T$, then the transceiver A' will receive the path from transceiver A at $\tau_A+\Delta T$.

On the other hand, the timing difference calculated by transceiver B' is also $\Delta T$, and transceiver B' requests transceiver B to put ahead the transmission timing by $\Delta T$. Then, transceiver B' will receive the path from the transceiver B at $\tau_B-\Delta T$. As a result, the communication between A and A' is still out of sync with communication between B and B' as illustrated in the bottom diagram of FIG. 12.

Figure 13:
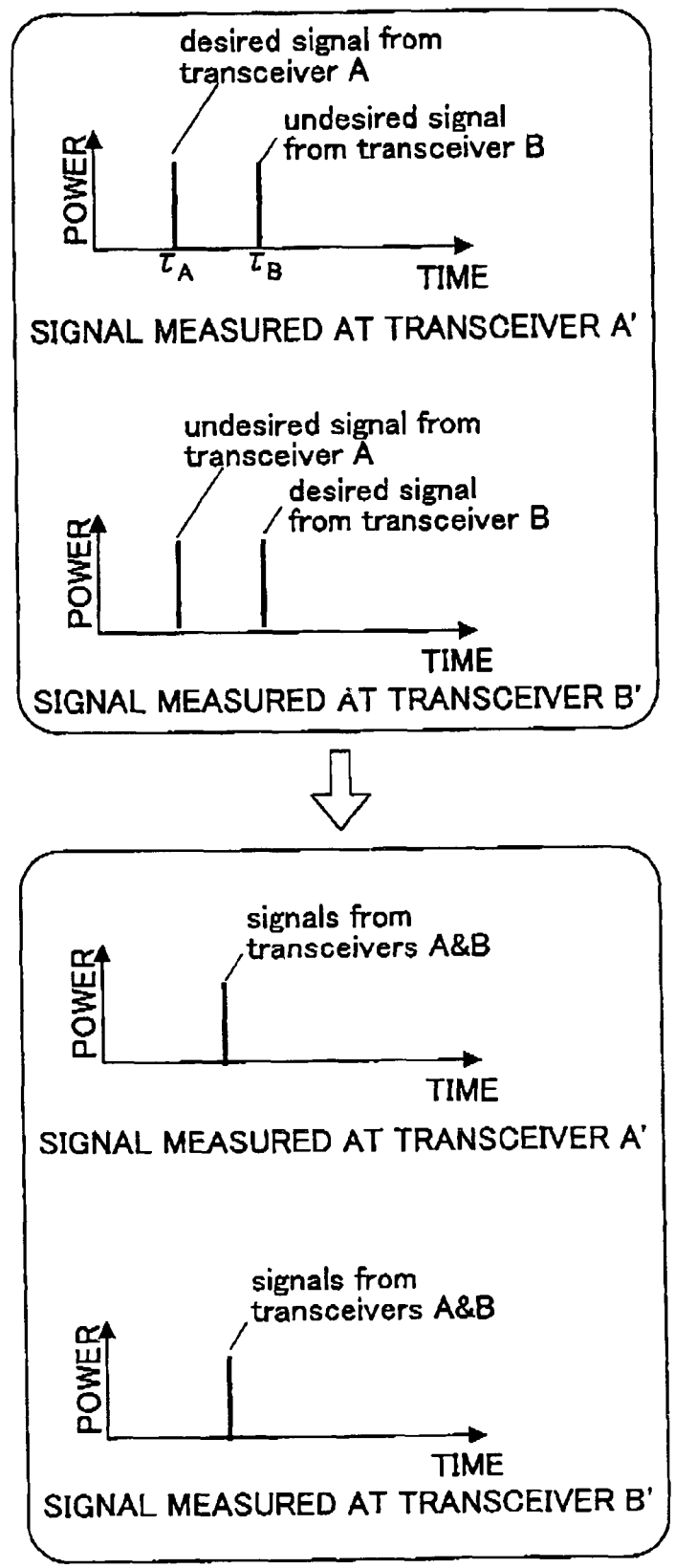
FIG. 13 is a schematic diagram illustrating timings of received signals measured at transceivers A' and B' where coefficient c equals 0.5 (c=0.5)

This problem is eliminated by modifying the timing difference using coefficient c. If transceiver A' requests transceiver A to put off the transmission timing by modified time difference $c*\Delta T$ (c equals, for example, ½), then the transceiver A' will receive the path from transceiver A at $\tau_A+c*\Delta T=\tau_A+\Delta T/2$. On the other hand, transceiver B' requests transceiver B to put ahead the transmission timing by $c*\Delta T$, then transceiver B' will receive the path from transceiver B at $\tau_B-c*\Delta T=(\tau_A+\Delta T)-c*\Delta T=\tau_A+\Delta T/2$. As a result, communication between transceivers A and A' is in sync with communication between transceivers B and B', as illustrated in the bottom diagram of FIG. 13. The value of the coefficient c is not necessarily ½, and an arbitrary fraction (less than 1) may be selected. By modifying the timing difference by a multiplier less than 1, the transmission timing to be shifted is made smaller than the unmodified time difference. This means that the next timing difference is expected to be smaller.

In this manner, each of the transceivers controls or adjusts the transmission timing of the desired signals taking transmission timing adjustment of undesired signal into consideration when bringing the signal receipt timing in sync with the other transceivers. In other words, the error signal $c*\Delta T$ to be supplied to the counterpart transceiver (for example, transceiver A) is determined in anticipation of a future shift of sync timing $\tau_B$ of an undesired signal toward the desired signal timing.

Returning to FIG. 11, in step 117, a feedback signal (a control signal or channel) containing the error signal $c*\Delta T$ representing the modified timing difference is produced. The feedback signal is detected by the counterpart transceiver at the control signal detection unit 720 and used to control the transmission timing of the counterpart transceiver.

In step 118, the control channel is multiplexed with a pilot channel and a data channel at the multiplexing unit 734 to produce a transmission signal. The transmission signal is transmitted to the counterpart transceiver at appropriate transmission timing as described above in conjunction with step 114. The multiplexing of the data channel may be withheld at the multiplexing unit 734 until appropriate synchronization is established between the transceivers. In this case, only the control channel and the pilot channel are transmitted to the counterpart transceiver until establishment of synchronization. By transmitting the data channel after synchronization is assured between the transceivers, interference given to the counterpart transceiver can be reduced as much as possible. Alternatively, transmission of a pilot signal may be performed a prescribed number of times prior to transmission of the data channel.

Example 2

In the above-described embodiment, the sync timing of the desired signal and the sync timing of the counterpart transceiver used as the basis of target sync timing are determined from the first path measurement. This arrangement is desired from the viewpoints of simplification of the transceiver structure and the arithmetic operations. However, using first path timing to determine the sync timing is not essential for the invention, and another basis may be used. For example, sync timing may be defined using averaged timing $\tau_n$ obtained by weighting and averaging the receipt power levels of the respective paths as expressed by Equation (1).

$$\tau_n = \sum_m \{|h_n(m)|^2 \times \tau_{mn}\} / \sum_m |h_n(m)|^2 \qquad (1)$$

where subscript "n" indicates that the quantity is directed to the $n^{th}$ transceiver, and $|h_n(m)|$ denotes the estimate of the electric field amplitude of the $m^{th}$ path received at the $n^{th}$ transceiver. By using sync timing $\tau_n$ reflecting the distribution of path power levels, the optimum symbol timing can be determined so as to minimize the interference due to those paths arriving exceeding the guard intervals in OFDM. In CDMA, the range of rake combination can be optimized, for example.

Example 3

Figure 14:
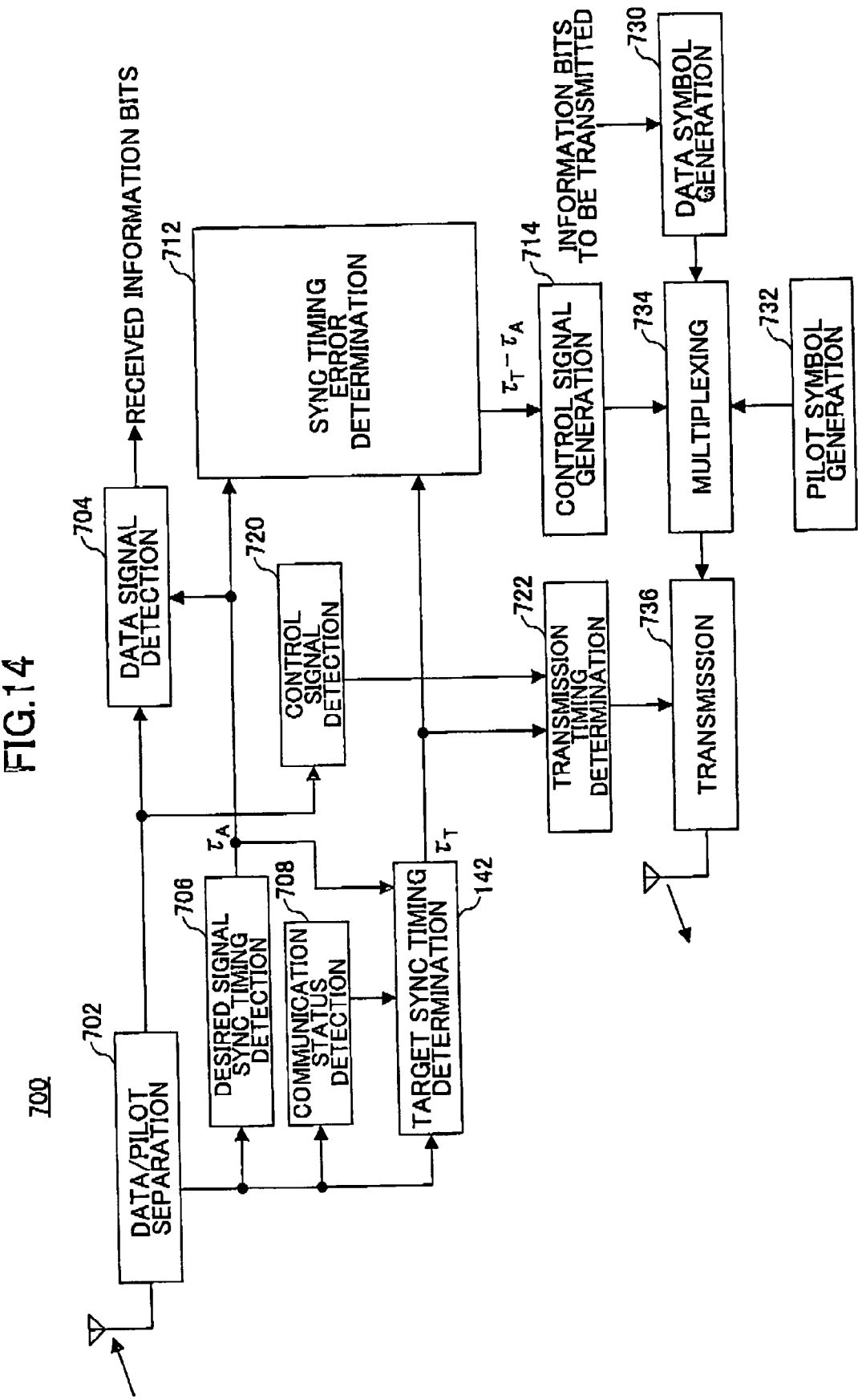
FIG. 14 is a block diagram of a transceiver according to another embodiment of the invention.

FIG. 14 is a schematic block diagram of a transceiver with a modified structure. The same components shown in FIG. 7 are denoted by the same symbols and overlapped explanation for them is omitted. In this modification, the output of the desired signal sync timing detection unit 706 is connected not only to the input of the sync timing error determination unit 712, but also to the input of the target sync timing determination unit 142.

Figure 15:
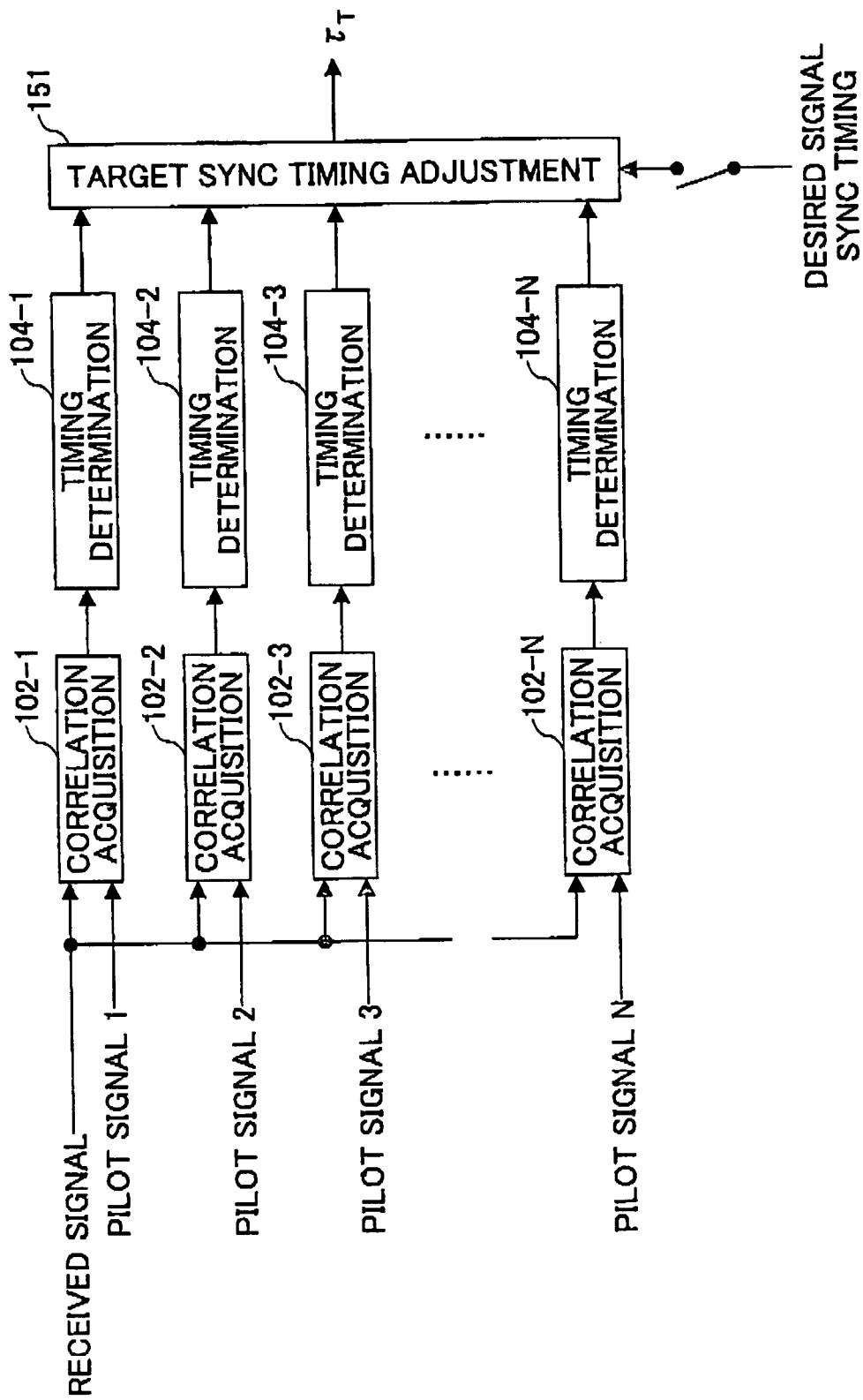
FIG. 15 is a schematic diagram of the target sync timing determination unit shown in FIG. 14.

FIG. 15 is a schematic diagram of the target sync timing determination unit 142. This structure may be close to that shown in FIG. 10, but is different in that the target sync timing is adjusted based on the sync timing of the desired signal.

The operations flow of the modified transceiver is almost the same as that shown in FIG. 11, except for steps 112 and 116. To be more precise, in step 111, the environmental communication status is monitored by the communication status detection unit 706.

In step 112, target sync timing is determined. If two or more sync timings of non-counterpart transceivers are detected, single sync timing is determined as the target sync timing. Unlike the pre-communication processing, the target sync timing is determined during radio communications taking into account not only multiple sync timings of the undesired signals, but also the sync timing of the desired signal. For example, in FIG. 6, the first paths of the counterpart and non-counterpart transceivers are measured at each of the transceivers A' and B', as illustrated in the top diagram of FIG. 12. The desired signal sync timing for transceiver A' is $\tau_A$, and undesired signal sync timing is $\tau_B=\tau_A+\Delta T$. These sync timing information items as to $\tau_A$ and $\tau_B$ are input to the target sync timing adjusting unit 151 shown in FIG. 15. It should be noted that desired signal sync timing $\tau_A$ is not input to the target sync timing adjusting unit 106 shown in FIG. 10. The target sync timing adjusting unit 151 calculates an arithmetic average of the desired signal sync timing $\tau_A$ and the undesired signal sync timings $\tau_B$ and outputs a target sync timing $\tau_T$. The target sync timing $\tau_T$ is expressed as $$\tau_T=(\tau_A+\tau_B)/2=\tau_A+\Delta T/2. \tag{2}$$

In step 113, transmission timing $t_{TX}$ is determined based on the target sync timing $\tau_T$. Prior to radio communication actually starting, the transmission timing is determined according to the sync timing $\tau_B$ of the counterpart transceiver. During radio communication, transmission timing is determined based on the control signal (error information reported from the counterpart transceiver). Alternatively, transmission timing may be determined taking the target sync timing $\tau_T=\tau_A+\Delta T/2$ into account, in addition to the control signal. In the latter case, the quantity of adjustment of transmission timing may be determined by averaging the information items supplied from the target sync timing determination unit 142 and the control signal detection unit 720. If a non-counterpart transceiver does not currently exist in the vicinity or is not performing radio communication, specific target sync timing is not determined, and the transceiver pair of A and A' can determine transmission timing without strict restriction.

In step 114, a transmission signal is transmitted at the determined timing.

In step 115, a timing difference $\Delta T$ between sync timing of the desired signal and the target sync timing is determined by the sync timing error determination unit 712. When sync timing of the desired signal is detected (during the communication), the timing difference $\Delta T$ becomes one different from Example 1. To be more precise, in FIG. 14, $\tau_A$ is output from the desired signal sync timing detection unit 706, and $\tau_T=\tau_A+\Delta T/2$ is output from the target sync timing determination unit 142. The sync timing error determination unit 712 calculates and outputs the difference $\tau_T-\tau_A=\Delta T/2$ between the two. This output value is different from the timing difference $\Delta T$ output in Example 1.

Step 116 of FIG. 11 is not performed in this example, and the calculated timing difference $\Delta T/2$ is included as it is in the control signal. In Example 3, transmission timing of the desired signal is also adjusted taking into account adjustment of transmission timing of the undesired signals as in Example 1 because the error signal supplied to the counterpart transceiver (e.g., A) of the desired signal is determined in anticipation of future correction or shifting of undesired signal sync timing ($\tau_B$) toward the desired signal sync timing. The different point is that the target sync timing is calculated taking into account not only the undesired signal sync timings, but also the desired signal sync timing. In other words, the target sync timing introduced in Example 3 is one expected after the updating of the transmission timings of the respective transceivers. For this reason, a multiplier c (0<c<1) is not required when calculating the transmission timing shifting quantity provided to the counterpart transceiver, and the output of the sync timing error detection unit 712 can be fed as it is back to the counterpart transceiver, unlike in Example 1.

In step 117, a feedback signal containing the error signal representing the timing difference is created. The feedback signal is detected by the counterpart transceiver at the control signal detection unit 720, and is used to control the transmission timing of the counterpart transceiver.

In step 118, the control channel is multiplexed with a pilot channel and a data channel at the multiplexing unit 734 to produce a transmission signal. The transmission signal is transmitted to the counterpart transceiver at appropriate transmission timing in step 114.

It is assumed that target sync timing $\tau_T$ is obtained by calculating an arithmetic average of the desired signal sync timing $\tau_0$ and (N−1) sync timings $\tau_1$ through $\tau_{N-1}$ of non-counterpart transceivers.

$$\tau_T=(\tau_0+\tau_1+\ldots,\tau_{N-1})/N \tag{3}$$

In this case, timing difference D calculated by the sync timing error determination unit 712 is expressed as $$D=\tau_0-\tau_T=[(N-1)\tau_0/N]-[(\tau_1+,\ldots,\tau_{N-1})/N]. \tag{4}$$

The outcome corresponds to the modified timing difference described in Example 1, in which coefficient c is set to (N−1)/N.

Example 4

Figure 16:
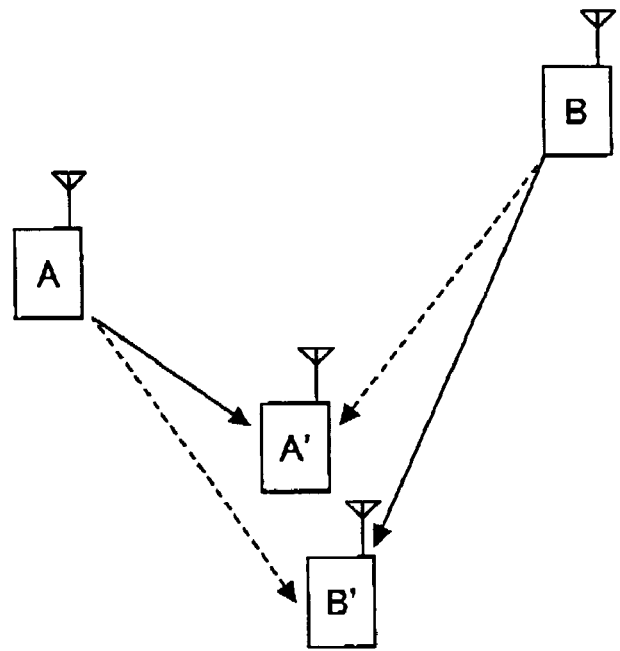
FIG. 16 is a schematic diagram illustrating multiple transceivers communicating with each other.

FIG. 16 illustrates the topology of four transceivers communicating with each other. Similar to FIG. 6, transceivers A and A' are communicating with each other, and transceivers B and B' are communicating with each other. Transceivers B and B' are non-counterparts for transceivers A and A', and vice versa. In the figure, the solid lines represent desired signals from the counterpart transceivers, and the dashed lines represent interference signals from the non-counterpart transceivers. In this configuration, each of the transceivers A' and B' receives a signal from transceiver A, and after that, each of them receives a signal from transceiver B, as depicted in the top diagrams of FIG. 12 and FIG. 13. Similarly, each of the transceivers A and B receives a signal from transceiver A', and after that, each of them receives a signal from transceiver B'. Accordingly, transceivers A and A' put ahead the transmission timings, while transceivers B and B' put off the transmission timings, to synchronize the transmission timings. The quantity of shifting the transmission timing $\tau_{TX}$ may be $(\tau_A+\tau_B)/2=\Delta T/2$ using the technique described in Example 1 or 3.

Figure 17:
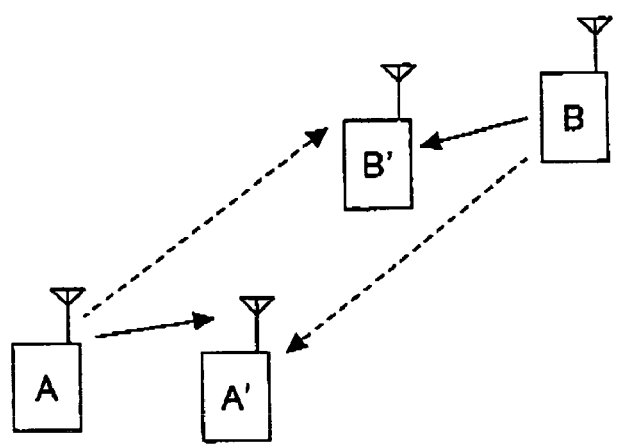
FIG. 17 is a schematic diagram illustrating multiple transceivers communicating with each other.
Figure 18:
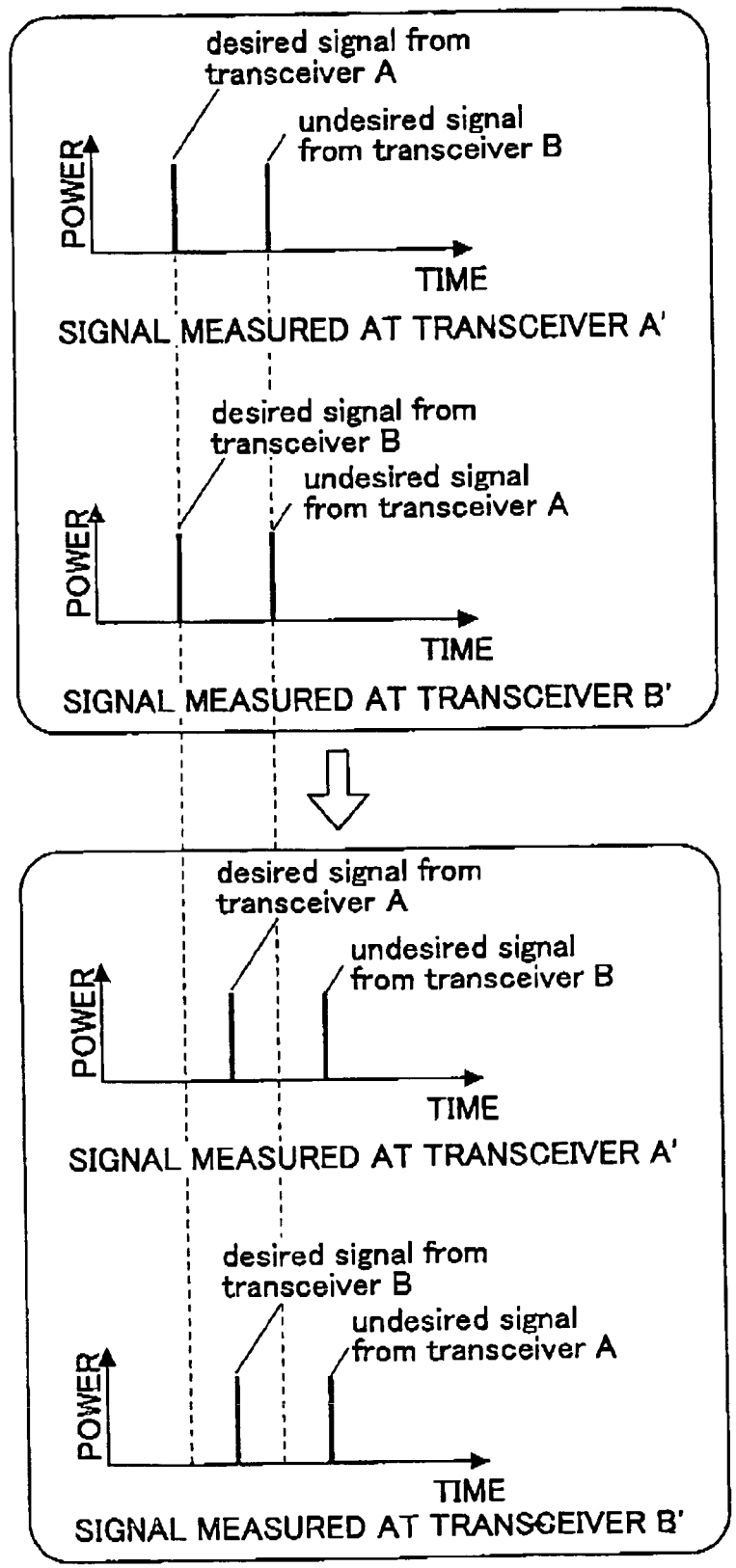
FIG. 18 is a schematic diagram illustrating timings of received signals measured at transceivers A' and B'.

FIG. 17 illustrates another topology of four transceivers communicating with each other. In this example, transceiver A' receives a signal from transceiver A, and after that, it receives a signal from transceiver B as illustrated in the top diagram of FIG. 18. Similarly, transceiver A receives a signal from transceiver A', and after that, it receives a signal from transceiver B'. Accordingly, each of the transceivers A and A' tries to put off the transmission timing.

On the other hand, transceiver B' receives a signal from transceiver B, and after that, it receives a signal from transceiver A. Similarly, transceiver B receives a signal from transceiver B', and after than, it receives a signal from transceiver A'. Consequently, each of the transceivers B and B' tries to put off the transmission timing. Because both communication pairs A-A' and B-B' put off the transmission timings, synchronization cannot be achieved as illustrated in the bottom diagram of FIG. 18. This means that depending on the number of transceivers involved and/or the topology, transmission timings of all the transceivers may not be synchronized accurately.

In general, the power levels of signals from non-counterpart transceivers received at a certain transceiver are not equal to each other. Among the undesired signals, some of them contribute greatly to the received signal, and others do not. In this example, target sync timing is obtained by weighting and averaging the power levels of the desired signal sync timing $\tau_0$ and (N−1) undesired signal sync timings $\tau_1$ through $\tau_{N-1}$. It is assumed that the total reception power level Pn summing up the power levels of signals from n transceivers and measured at a certain transceiver is expressed as $$p_n = \sum_{m=1}^{M} |h_n(m)|^2 \quad (5)$$

where m is a parameter designating each of m paths ($1 \leq m \leq M$; M is the assumed maximum number of paths), and $|h_n(m)|$ denotes the estimate of the electric field amplitude of the $m^{th}$ path. Target sync timing $\tau$ is determined by weighting averaging N sync timings using the total receipt power level Pn as expressed by $$\tau = \sum_n \{p_n \times \tau_n\} \Big/ \sum_n p_n \quad (6)$$

where $\tau_n$ denotes sync timing for the $n^{th}$ transceiver. The target sync timing $\tau$ weighting averaged by power levels is the most significant timing greatly affecting the transceiver from the viewpoint of receipt power level. Although the transceivers are not completely in sync with each other even if receiving the desired signals at this target sync timing, it is still advantageous because each of the transceivers can improve the signal receiving characteristic. The signal receiving characteristic is evaluated by, for example, frame error rate or throughput. Since in order to calculate the target sync timing information about the desired signal power level $p_0$ and sync timing $\tau_0$ are required, it is preferable to combine Example 4 with Example 3.

Example 5

FIG. 19A through FIG. 19D are schematic diagrams for explaining examples of correction for transmission timing when received signal power level is used. In this example, it is assumed that mobile station A is starting radio communication with mobile station A' when mobile station B is already communicating with another mobile station. The mobile station A' receives signals from mobile stations A and B, and it can directly measure the power levels of the signals transmitted from these two stations.

First, if the power level of the received signal from mobile station A or B is sufficiently high, it is assumed that the mobile station A or B is located geographically close to mobile station A'. In the configuration shown in FIG. 19A in which mobile stations A and B are located close to each other, mobile station A transmits signals at the signal receiving timing received from mobile station B because signal transmission time between mobile stations A and B is very short if the distance between mobile stations A and A' is almost the same as that between mobile stations B and A' and if the distance between mobile stations A and B is sufficiently short.

Figure 19A:
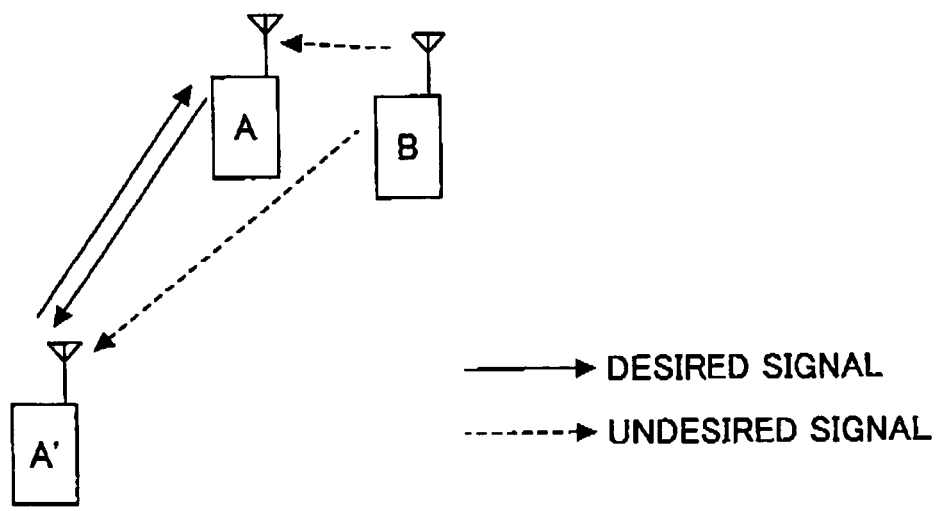
FIG. 19A through FIG. 19D are schematic diagrams illustrating multiple transceivers communicating with each other.
Figure 19B:
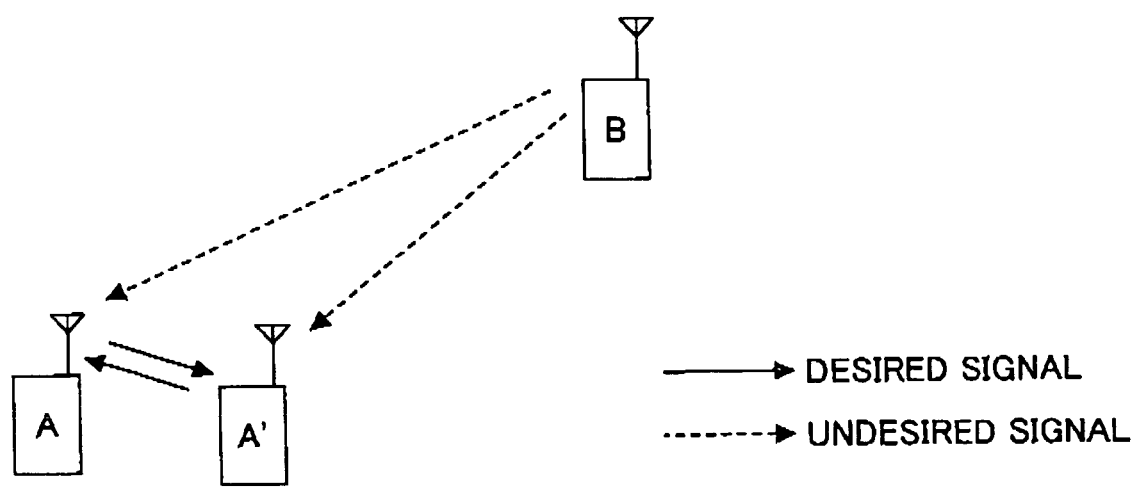

If mobile stations A and A' are located very close to each other as illustrated in FIG. 19B, it is assumed that signal receiving timing from mobile station B is almost the same at mobile stations A and A'. In addition, because the signal transmission time between mobile stations A and A' is very short, mobile station A transmits signals at the signal receiving timing received from mobile station B.

Figure 19C:
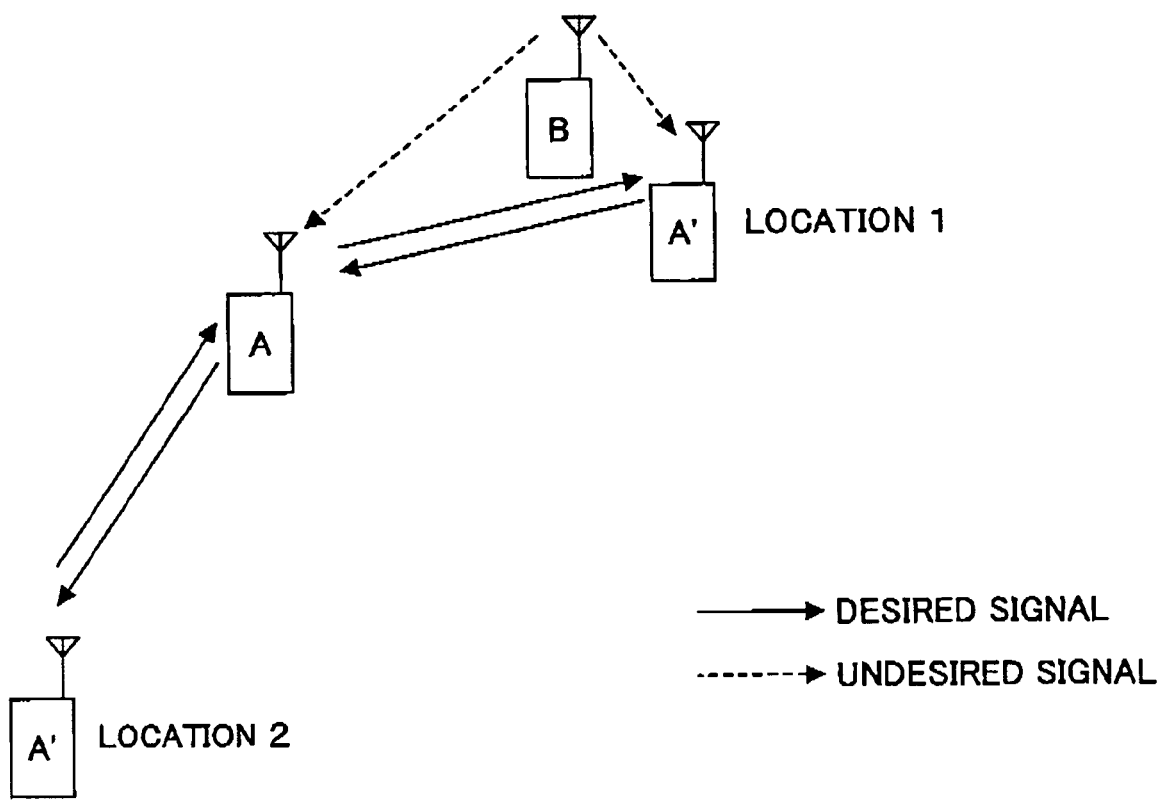
Figure 19D:
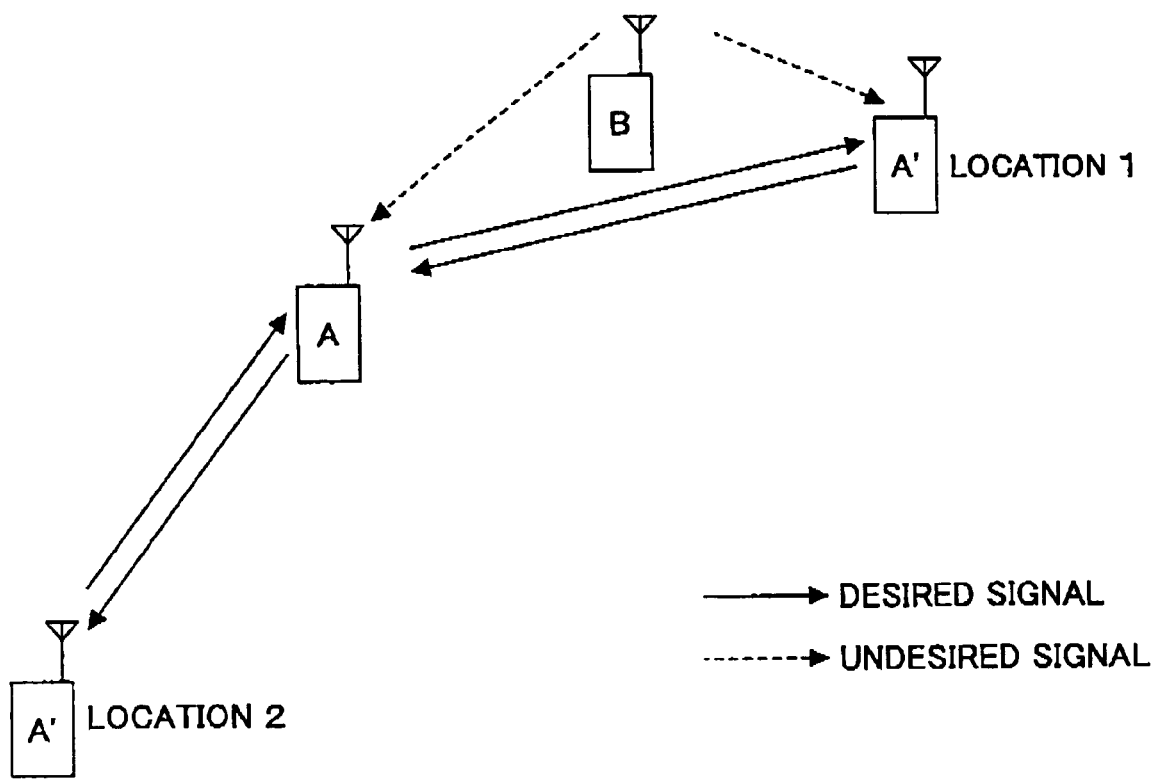

In configurations shown in FIG. 19C and FIG. 19D, if the received signals from mobile stations B and A' are weak to a certain degree, and if the received power levels are similar to each other, then the ideal transmission timing depends on the distance between the mobile stations A' and B. If mobile station A' is located close to mobile station B (location 1), it is preferable for mobile station A to estimate propagation time to mobile station A' and transmit a signal to mobile station A' before a signal from mobile station B is received at mobile station A. On the other hand, if mobile station A' is located on the opposite side of mobile station B (location 2), it is preferable for mobile station A to transmit signals to mobile station A' at the signal receiving timing received from mobile station B.

Accordingly, if mobile station A is capable of detecting the directions in which mobile stations A' and B are located, it is desired to make use of these directions and shift the signal receiving timing by a necessary period of time. If mobile station A cannot detect the directions of mobile station A' or B, mobile station A may determine transmission timing by putting ahead the signal receiving timing from mobile station B by a half of the estimated propagation time.

If the difference in received power levels from mobile stations B and A' is large as illustrated in FIG. 19D, it is assumed that the distance between mobile station B and mobile station A' is long. If in this situation the mobile station A cannot estimate the signal arriving directions, the transmission timing shifting amount may be reduced. In other words, the transmission timing may be put ahead by a time period shorter than a half of the estimated propagation time. To what extent the timing shifting amount is reduced may be determined from the difference between the received signal power levels from mobile stations A' and B.

The ideal timing for all the transceivers may not exist depending on the geographic relationship. In this case, it is undesirable for the system for transmission timing at each mobile station to change frequently. If mobile station C is starting signal transmission near communication pairs A-A' and B-B', mobile station C determines the transmission timing using the signal receiving timing of the previous frames of the mobile stations A, A', B and B'. However, when mobile station C receives the signals, the ideal transmission timing has changed from that in the previous frame, and it is a concern that the signal from mobile station C may be received out of sync as compared with the ideal situation. This problem may occur even if mobile station C is communicating with another station. It is undesirable for the transmission timing to change unnecessarily from the view point of converging the multiple transmission timings to the reduced number of timings (ideally to a single transmission timing).

One technique for solving this problem is to determine an acceptable timing error in advance, and if the timing offset is within the range of the acceptable timing error, the amount of timing shift (updating) is set to zero. In this case, a control signal fed back to the counterpart transceiver represents an instruction for continuously using the currently selected transmission timing. The size of the acceptable timing error may be set as small as negligible.

Figure 20A:
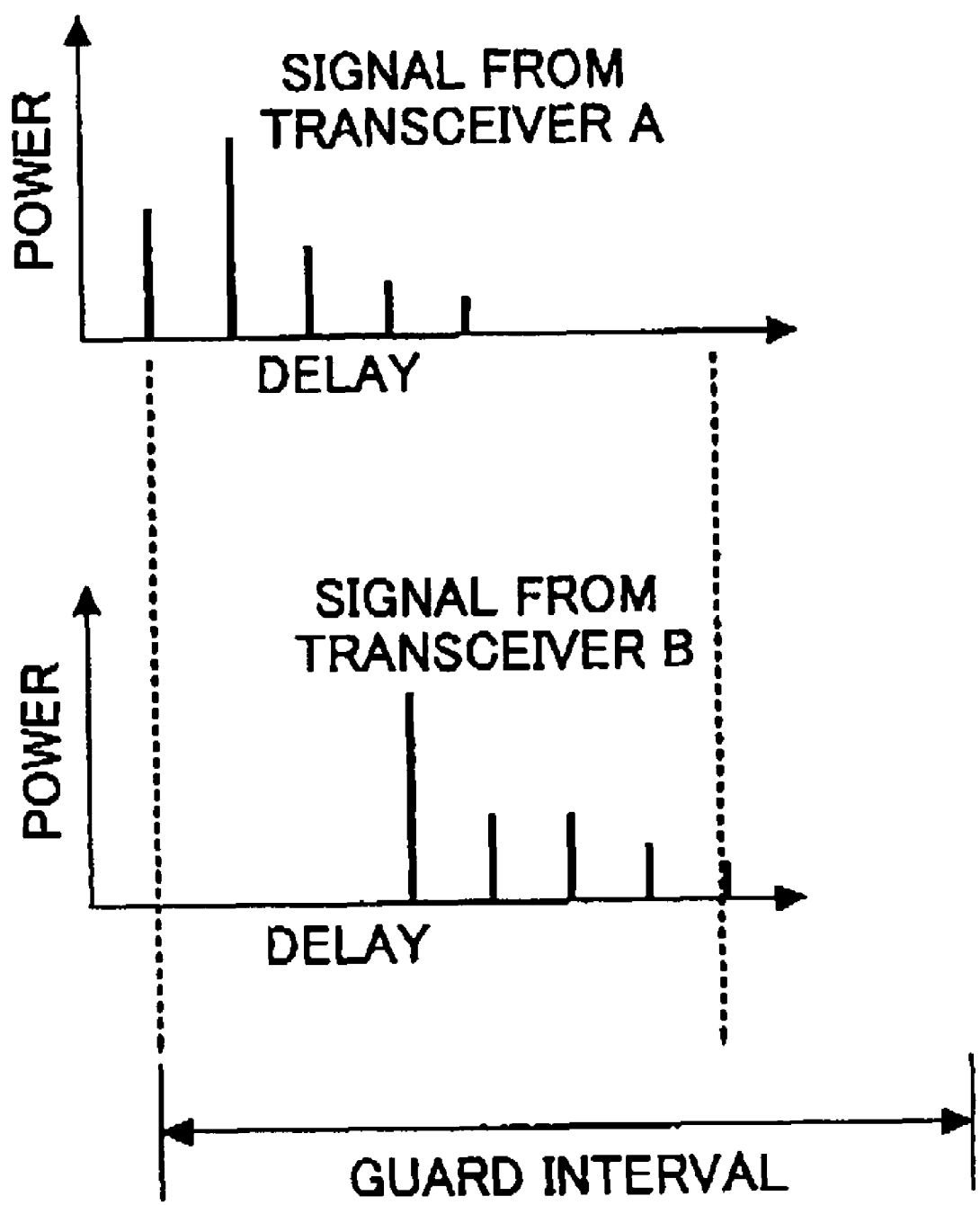
FIG. 20A through FIG. 20C are schematic diagrams illustrating examples of relationship between guard interval length and channel impulse response length.
Figure 20B:
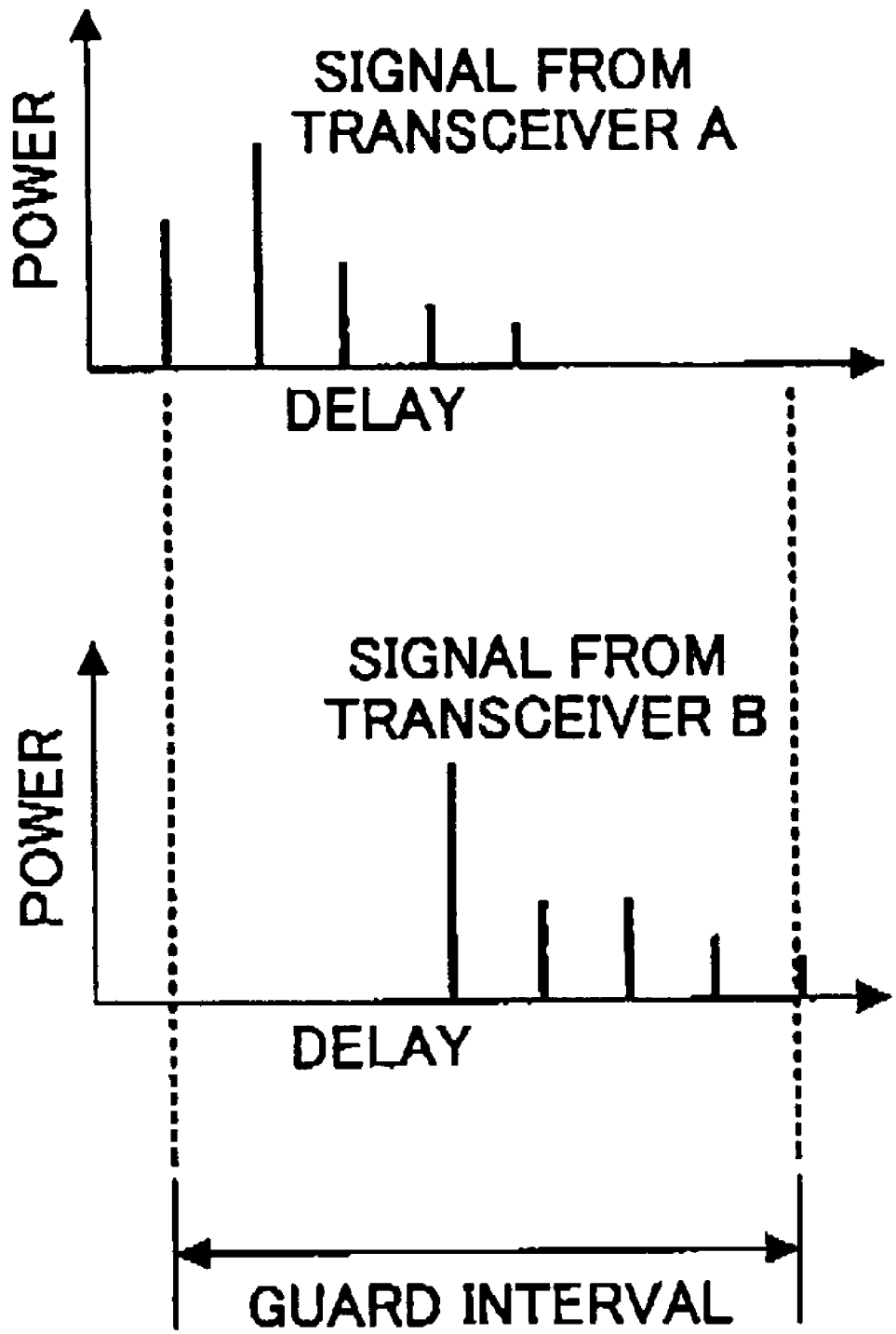
Figure 20C:
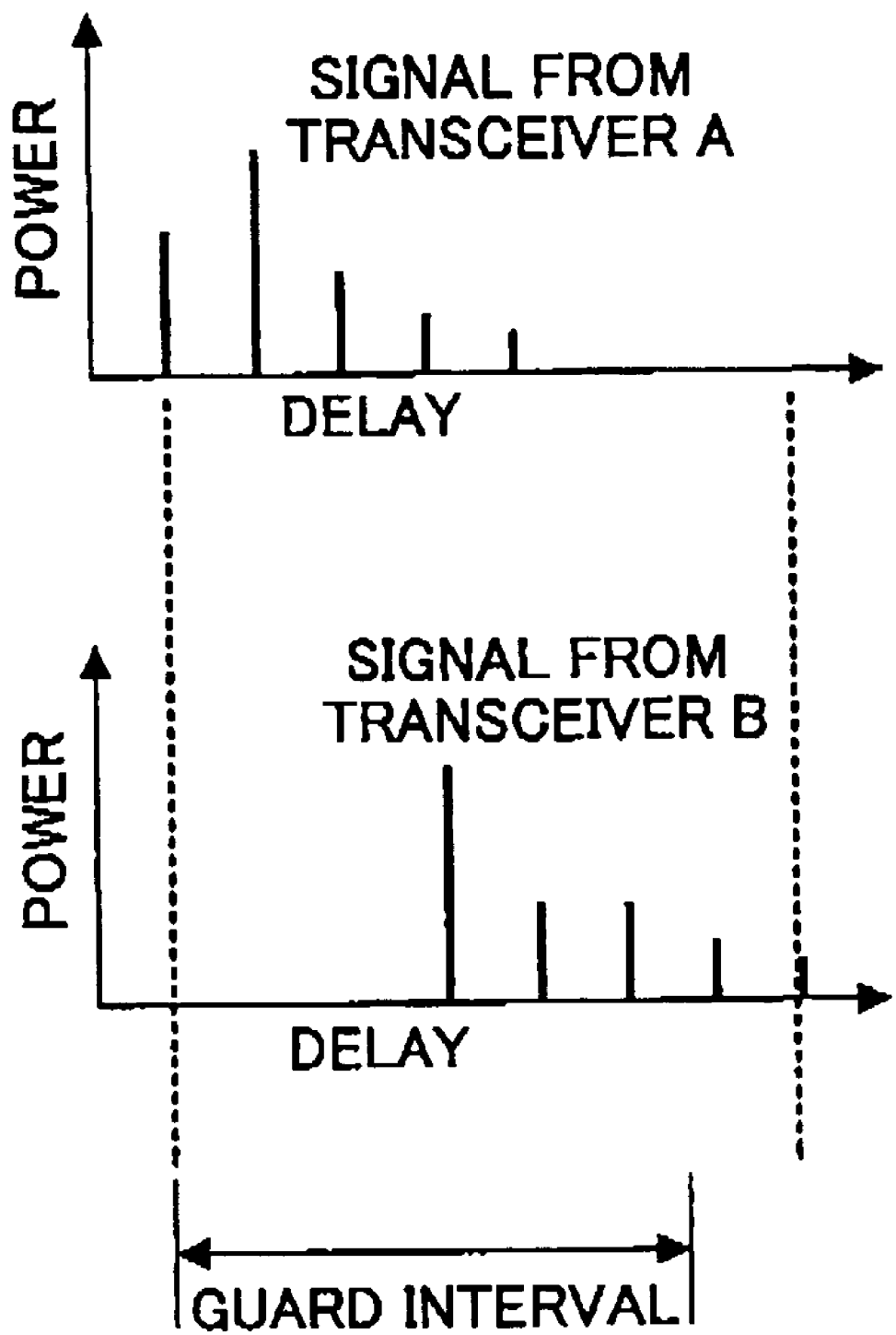

If CDMA is employed, it is desired that the desired wave and the interference wave be within the guard interval length (or period). Accordingly, transmission timing may be adjusted depending on whether the difference between the guard interval and the channel impulse response length (period) including both the desired wave and the interference wave received at a mobile station is greater than a prescribed value. If the guard interval length is longer than the channel impulse response period as illustrated in FIG. 20A, transmission timing is not changed, and the currently selected timing is maintained. If the guard interval length is equal to or shorter than the channel impulse response length as illustrate in FIG. 20B and FIG. 20C, transmission timing is changed to an appropriate one.

This patent application is based upon and claims the benefit of the earlier filing date of Japanese Patent Application No. 2005-128500 filed Apr. 26, 2005, the entire contents of which are hereby incorporated by reference.

What is claimed is:

1. A transceiver used in a mobile communication system, which system allows a plurality of transceivers to communicate in a same frequency band, comprising:
 a first sync timing detection part configured to detect sync timing for a desired signal transmitted from a counterpart transceiver;
 a target sync timing detection part configured to detect sync timings for one or more undesired signals from non-counterpart transceiver(s) and determine a target sync timing;
 an error information determination part configured to determine error information indicating a time period obtained by calculating a timing difference between the sync timing for the desired signal and the target sync timing and multiplying the timing difference by a coefficient such that the time period becomes shorter than the timing difference;
 a feedback signal generating part configured to generate a feedback signal containing the error information;
 a transmission timing determination part configured to update transmission timing for a transmission signal including the feedback signal according to a control signal received from the counterpart transceiver; and
 a transmission part configured to transmit the transmission signal to the counterpart transceiver according to the updated transmission timing;
 wherein the transmission timing determination part is configured to determine the transmission timing based on the target sync timing determined by the target sync timing detection part prior to starting radio communication with the counterpart transceiver based on the target sync timing and a time period indicated by the control signal during radio communication with the counterpart transceiver, such that the transmission timing synchronizes with a transmission timing of the non-counterpart transceiver to improve accuracy in distinguishing counterpart transceiver transmissions from overlapping non-counterpart transceiver transmissions, and
 the error information determination part determines the time period shorter than the timing difference by multiplying the timing difference by $(N-1)/N$, where N denotes the number of transceivers simultaneously communicating in the frequency band.

2. The transceiver of claim 1, further comprising:
 a communication status detection part configured to output a communication status signal representing communication status of the non-counterpart transceiver to the target sync timing detection part.

3. The transceiver of claim 1, wherein the transmission timing determination part determines the transmission timing based on at least one of the currently selected transmission timing, the time period contained in the control signal, and the target sync timing.

4. The transceiver of claim 1, wherein the transmission part withholds transmission of a data signal and transmits only a pilot signal until the timing difference becomes smaller than a prescribed value.

5. The transceiver of claim 1, wherein the transmission part transmits a pilot signal a prescribed number of times before a data signal is transmitted.

6. The transceiver of claim 1, further comprising:
 a communication status detection part configured to output a communication status signal representing a communication status of the non-counterpart transceiver;
 wherein the target sync timing detection part performs weighting averaging on the sync timing for the desired signal and the sync timings for the undesired signals based on the communication status signal to calculate the target sync timing.

7. The transceiver of claim 6, wherein the target sync timing determination part calculates the target sync timing by an arithmetic average of the sync timings for the desired and undesired signals.

8. The transceiver of claim 6, wherein the target sync timing determination part performs weighting averaging on the sync timings for the desired and undesired signals using receiving signal power levels to calculate the target sync timing.

9. The transceiver of claim 1, wherein the transmission timing determination part adjusts the transmission timing based on propagation delay from the counterpart transceiver.

10. The transceiver of claim 1, wherein the transmission timing determination part adjusts the transmission timing based on a receiving signal arriving direction.

11. The transceiver of claim 1, wherein the transmission timing determination part changes the transmission timing when a timing error indicated by the error information is greater than a prescribed value.

12. A mobile communication system including a plurality of transceivers performing radio communication in a same frequency band, each of at least two of the transceivers comprising:
- a first sync timing detection part configured to detect sync timing for a desired signal transmitted from a counterpart transceiver;
- a second sync timing detection part configured to detect sync timings for one or more undesired signals from non-counterpart transceiver(s) and determine a target sync timing;
- an error information determination part configured to determine error information indicating a time period obtained by calculating a timing difference between the sync timing for the desired signal and the target sync timing and multiplying the timing difference by a coefficient such that the time period becomes shorter than the timing difference;
- a feedback signal generating part configured to generate a feedback signal containing the error information;
- a transmission timing determination part configured to update transmission timing for a transmission signal including the feedback signal according to a control signal received from the counterpart transceiver; and
- a transmission part configured to transmit the transmission signal to the counterpart transceiver according to the updated transmission timing,
- wherein the transmission timing determination part is configured to determine the transmission timing based on the target sync timing determined by the second sync timing detection part prior to starting radio communication with the counterpart transceiver or based on the target sync timing and a time period indicated by the control signal during radio communication with the counterpart transceiver, such that the transmission timing synchronizes with a transmission timing of the non-counterpart transceiver(s) to improve accuracy in distinguishing counterpart transceiver transmissions from overlapping non-counterpart transceiver transmissions, and
- the error information determination part determines the time period shorter than the timing difference by multiplying the timing difference by $(N-1)/N$, where N denotes the number of transceivers simultaneously communicating in the frequency band.

13. A radio transmitting method applied to a mobile communication system allowing a plurality of transceivers to communicate in a same frequency band, the method comprising the steps of:
- detecting sync timing for a desired signal from a counterpart transceiver;
- outputting a communication status signal representing a communication status of a non-counterpart transceiver;
- performing weighting averaging sync timing for an undesired signal from the non-counterpart transceiver based on the communication status signal to calculate target sync timing, said performing step including calculating a timing difference between the sync timing for the desired signal and the target sync timing and multiplying the timing difference by a coefficient such that the time period becomes shorter than the timing difference;
- determining transmission timing based on a time period indicated in a control signal received from the counterpart transceiver; and
- transmitting a transmission signal including a feedback signal to the counterpart transceiver according to the transmission timing, the feedback signal representing a time period shorter than a timing difference between the sync timing for the desired signal and the target sync timing, wherein
- said transmitting step includes determining transmission timing based on the target sync timing determined in the performing step prior to starting radio communication with the counterpart transceiver or based on the target sync timing and a time period indicated by the control signal during radio communication with the counterpart transceiver, such that the transmission timing synchronizes with a transmission timing of the non-counterpart transceiver to improve accuracy in distinguishing counterpart transceiver transmissions from overlapping non-counterpart transceiver transmissions, and
- the error information determination part determines the time period shorter than the timing difference by multiplying the timing difference by $(N-1)/N$, where N denotes the number of transceivers simultaneously communicating in the frequency band.

* * * * *